(12) United States Patent
Nishioka et al.

(10) Patent No.: US 6,199,206 B1
(45) Date of Patent: *Mar. 6, 2001

(54) TELEVISION TRANSMITTER, TELEVISION TRANSMITTING METHOD, TELEVISION RECEIVER AND TELEVISION RECEIVING METHOD

(75) Inventors: Hisao Nishioka, Chiba; Takaaki Enomoto; Jun Ota, both of Tokyo; Chisato Kisanuki, Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/735,706

(22) Filed: Oct. 23, 1996

(30) Foreign Application Priority Data

Oct. 24, 1995 (JP) ...................................... 7-275621

(51) Int. Cl.⁷ .............................. H04N 7/173; G06F 3/00; G06F 13/00
(52) U.S. Cl. ............................... 725/51; 725/52; 725/110; 725/112; 725/40; 709/219
(58) Field of Search .................. 348/906, 7, 12, 348/13; 455/5.1, 6.3; 345/327; 395/200.47; 725/51, 52, 61, 112, 110, 40

(56) References Cited

U.S. PATENT DOCUMENTS

| | | | |
|---|---|---|---|
| 5,570,295 | * 10/1996 | Isenberg et al. | 379/90.01 |
| 5,801,753 | * 9/1998 | Eyer et al. | 348/13 |
| 5,812,776 | * 9/1998 | Gifford | 395/200.47 |
| 5,818,441 | * 10/1998 | Throckmorton et al. | 345/328 |

* cited by examiner

Primary Examiner—Nathan Flynn
Assistant Examiner—Vivek Srivastava
(74) Attorney, Agent, or Firm—Limbach & Limbach, LLP

(57) ABSTRACT

A TV transmitter, a TV transmitting method, a TV receiver and a TV receiving method allowing users to find and choose desired programs through the use of a program guide displayed by graphical user interface (GUI). The TV transmitter comprises a signal generation unit for generating text data signals associated with TV broadcast programs and hyper text data signals corresponding to the text data signals, a multiplexer for multiplexing the text data signals and the hyper text data signals onto video signals of the TV broadcast programs to provide a multiplexed TV broadcast signal, and an output unit for outputting the multiplexed TV broadcast signal provided by the multiplexer. The TV receiver comprises a display unit for receiving and displaying text data signals extracted from a multiplexed TV broadcast signal interleaving the text data signals associated with TV broadcast programs and hyper text data signals corresponding to the text data signals a designation unit for designating any one of the text data signals displayed by the display unit a detection unit for detecting the hyper text data signal corresponding to the text data signal designated by the designation unit and a processing unit for processing the TV broadcast program corresponding to the hyper text data signal detected by the detection unit.

48 Claims, 18 Drawing Sheets

F I G. 3
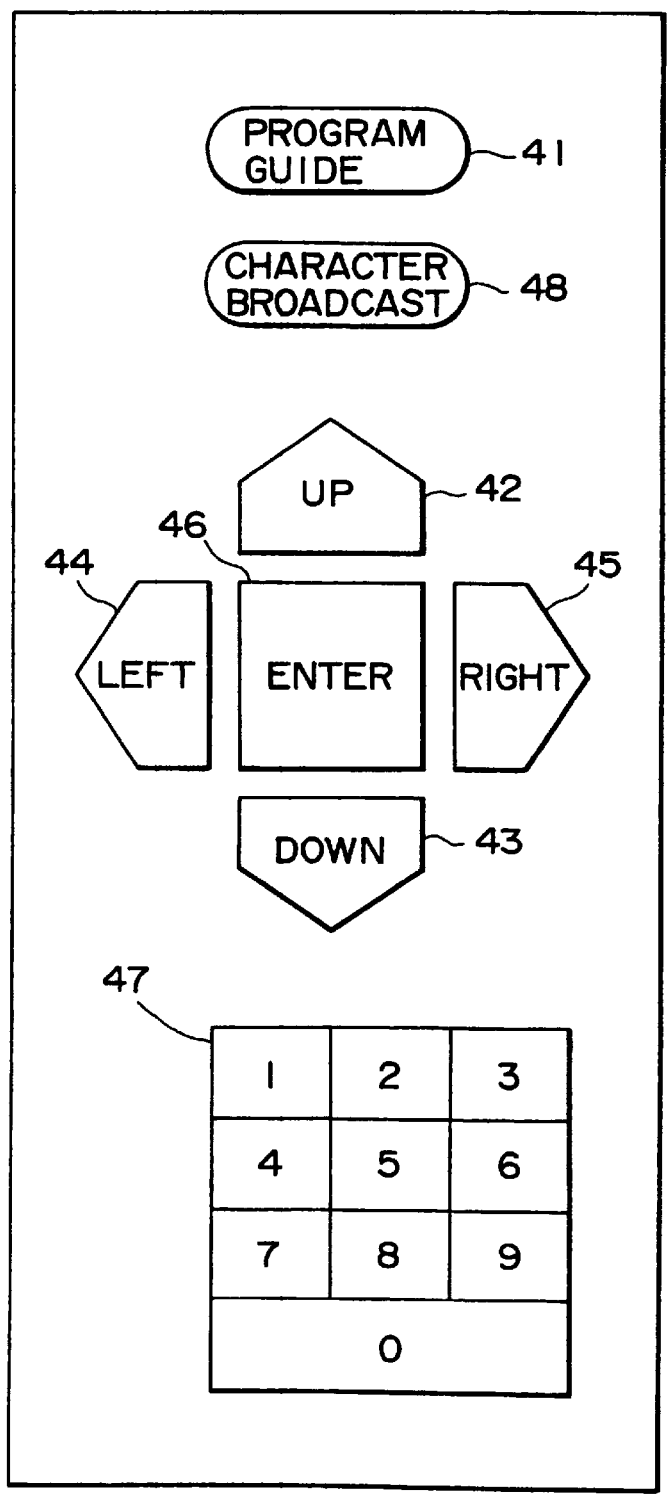

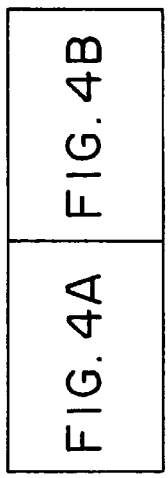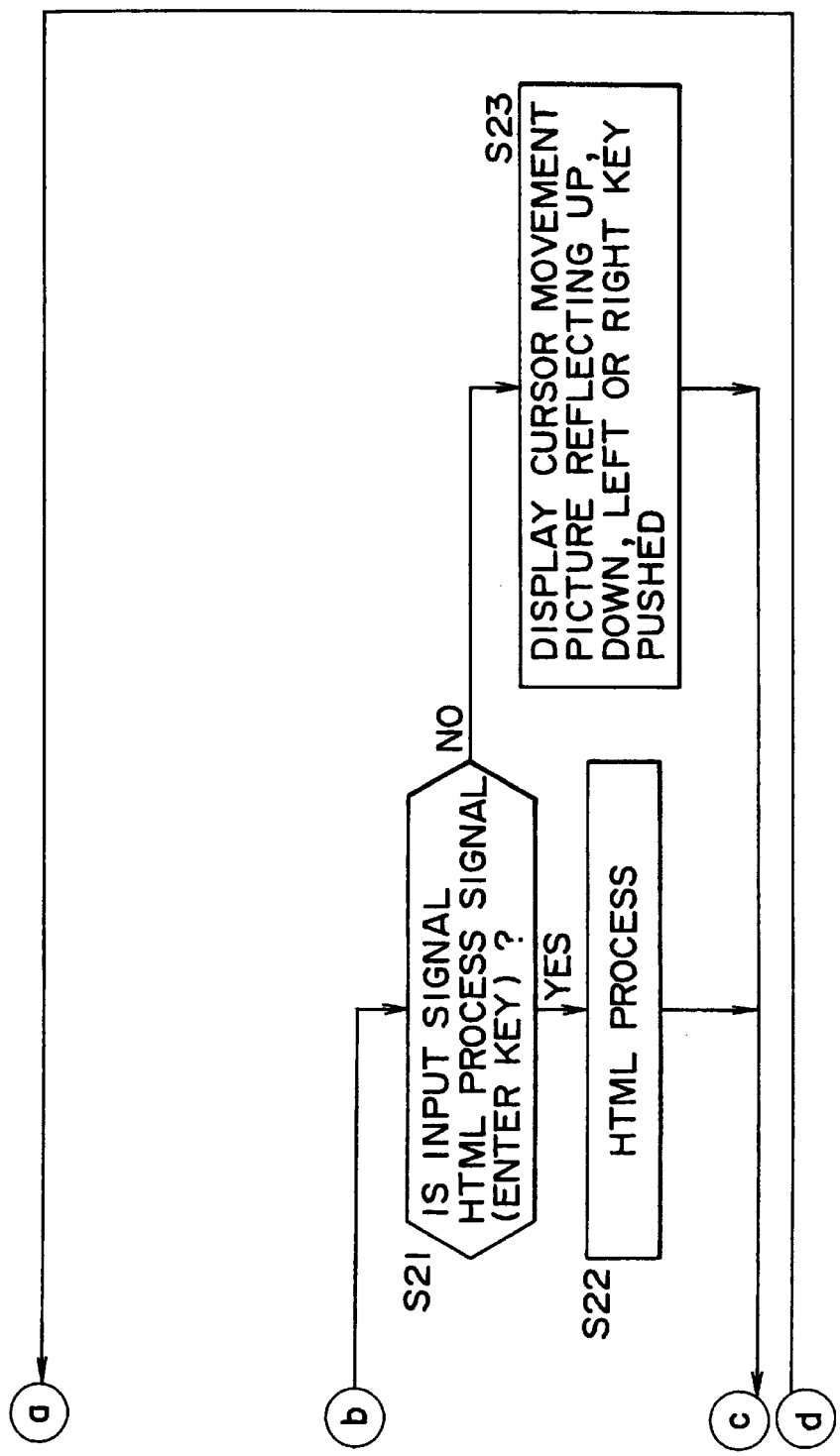

What's the matter with you?

SCREEN THAT APPEARS WHEN TEXT T41 "LESSONS IN EVERYDAY ENGLISH CONVERSATION" IN FIG.7 IS SELECTED

FIG. 9

INTRODUCING THE INSTRUCTORS

MONDAY : JOHN SMITH

TUESDAY : ANNA O'NEAL

FRIDAY : CAY KATO

PRECEDING SCREEN — T32
RETURN TO HOME PAGE — T31
} DISPLAYED IN BLUE

SCREEN THAT APPEARS WHEN TEXT T42 "INSTRUCTORS" IN FIG.7 IS SELECTED

SCREEN THAT APPEARS WHEN TEXT T43 "THE TEXTBOOK" IN FIG. 7 IS SELECTED

THE TEXTBOOK PAGES FOR ONE LESSON
COST ¥100.
ASK FOR YOUR COPY OF THE PAGES AT
03-3123-4567.
WE WILL START FAXING THE PAGES
ABOUT ONE MINUTE AFTER YOUR ORDER
IS ACCEPTED.

CHECK — T51
DISPLAYED IN BLUE http://www.nhk.eng./Fax — A10
PRECEDING SCREEN — T32
RETURN TO HOME PAGE — T31
DISPLAYED IN BLUE

SCREEN THAT APPEARS WHEN TEXT T44 "FAX"
IN FIG. 7 IS SELECTED

SETTING THE VCR TO VIDEOTAPE

SELECT THE TITLE OF ANY ONE OF THE MOVIES DISPLAYED, AND YOUR VCR WILL BE SET AUTOMATICALLY TO VIDEOTAPE THE SELECTED MOVIE.

A10

PRECEDING SCREEN — T32
RETURN TO HOME PAGE — T31
DISPLAYED IN BLUE

SCREEN THAT APPEARS WHEN TEXT T101 "SET YOUR VCR TO VIDEOTAPE" IN FIG.16 IS SELECTED

TELEVISION TRANSMITTER, TELEVISION TRANSMITTING METHOD, TELEVISION RECEIVER AND TELEVISION RECEIVING METHOD

BACKGROUND OF THE INVENTION

The present invention relates to a television transmitter, a television transmitting method, a television receiver and a television receiving method. More particularly, the invention relates to a television transmitter and a television transmitting method whereby a hyper text data signal associated with television broadcast is prepared and transmitted, as well as to a television receiver and a television receiving method whereby the transmitted hyper text data signal is received and processed.

Systems capable of digitally transmitting the television broadcast signal via satellite (broadcasting or communication satellite) to households are getting widespread acceptance. Such systems each offer the household a very large number of TV programs carried illustratively by nearly 80 channels to choose from.

With the ever-growing number of programs they can transmit, these systems propose transmitting along with the programs an electronic program guide (EPG) allowing users to choose desired programs easily. The EPG, when implemented, is displayed on a monitor screen so that preferred programs may be selected quickly and unfailingly.

With related art analog television broadcast, however, attempts to practice the proposed program guide service are faced with a number of difficulties. Large amounts of additional hardware for the service must be provided on both the transmitting and the receiving sides. The constitution of such hardware is necessarily complicated.

SUMMARY OF THE INVENTION

It is therefore an object of the present invention to overcome the above-described drawbacks of the related art and to provide a television transmitter, a television transmitting method, a television receiver and a television receiving method allowing users to find and choose desired programs in a fast and reliable manner through the use of a program guide displayed by graphical user interface (GUI).

In carrying out the invention and according to a first aspect thereof, there is provided a television transmitter comprising a signal generation means for generating text data signals associated with television broadcast programs and hyper text data signals corresponding to the text data signals, a multiplex means for multiplexing the text data signals and the hyper text data signals onto video signals of the television broadcast programs to provide a multiplexed television broadcast signal and an output means for outputting the multiplexed television broadcast signal provided by the multiplex means.

According to a second aspect of the invention, there is provided a television transmitting method comprising the steps of generating text data signals associated with television broadcast programs and hyper text data signals corresponding to the text data signals, multiplexing the text data signals and the hyper text data signals onto video signals of the television broadcast programs to provide a multiplexed television broadcast signal and outputting the multiplexed television broadcast signal.

According to a third aspect of the invention, there is provided a television receiver comprising a display means for receiving and displaying text data signals extracted from a multiplexed television broadcast signal interleaving the text data signals associated with television broadcast programs and hyper text data signals corresponding to the text data signals, a designation means for designating any one of the text data signals displayed by the display means, a detection means for detecting the hyper text data signal corresponding to the text data signal designated by the designation means and a processing means for processing the television broadcast program corresponding to the hyper text data signal detected by the detection means.

According to a fourth aspect of the invention, there is provided a television receiver comprising an extraction means for extracting domain information from a multiplexed television broadcast signal interleaving hyper text data signals including the domain information on a network offering network services related to television broadcast programs, a connection means for establishing connection with an access point corresponding to the domain information on the network, a reception means for receiving data from the access point connected by the connection means and a processing means for processing the data received by the reception means.

According to a fifth aspect of the invention, there is provided a television receiving method comprising the steps of receiving and displaying text data signals extracted from a multiplexed television broadcast signal interleaving the text data signals associated with television broadcast programs and hyper text data signals corresponding to the text data signals, designating any one of the text data signals displayed; detecting the hyper text data signal corresponding to the designated text data signal and processing the television broadcast program corresponding to the hyper text data signal detected.

These and other objects, features and advantages of the invention will become more apparent upon a reading of the following description and appended drawings.

BRIEF DESCRIPTION OF THE DRAWINGS

FIG. 3 is a schematic view outlining the operation unit of a remote commander;

FIGS. 4A–4B are flowchart of steps in which the TV receiver of FIG. 2 operates;

FIG. 9 is a view of a screen that appears when the text T42 in the display screen of FIG. 7 is selected;

DESCRIPTION OF THE PREFERRED EMBODIMENTS

Figure 1:
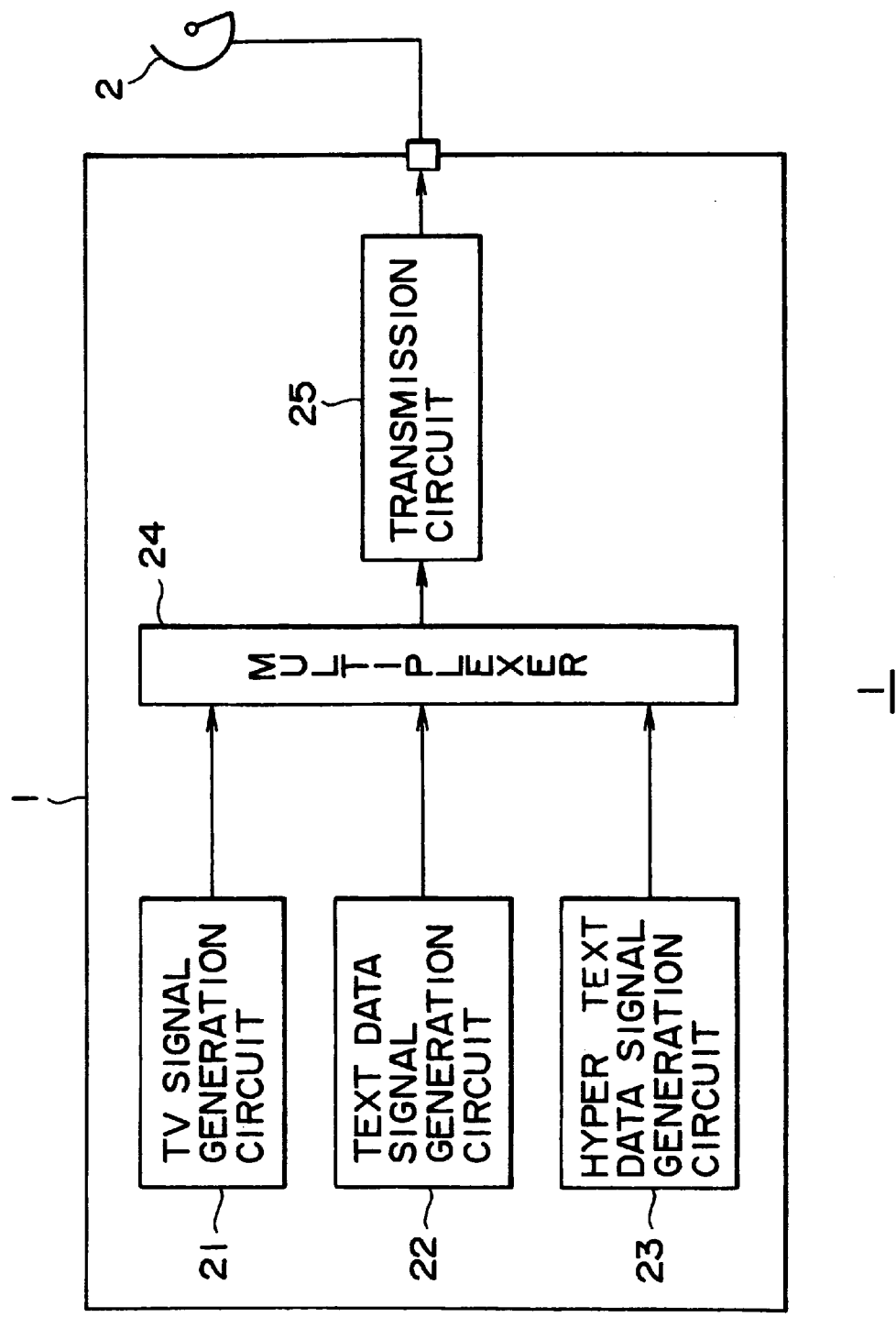
FIG. 1 is a block diagram of a TV transmitter embodying the invention.

Preferred embodiments of the invention will now be described with reference to the accompanying drawings. In the description that follows, the means constituting some of the embodiments outlined above are shown corresponding to specific components to be described below, each means being equated with its typical counterpart identified in parentheses. It should be noted that the description is only for illustrative purposes and is not limitative of the invention.

The television transmitter according to the first aspect of the invention comprises signal generation means (e.g., hyper text data signal generation circuit 23 in FIG. 1) for generating text data signals associated with television broadcast programs and hyper text data signals corresponding to the text data signals; multiplex means (e.g., multiplexer 24 in FIG. 1) for multiplexing the text data signals and hyper text data signals onto video signals of the television broadcast programs to provide a multiplexed television broadcast signal; and output means (e.g., transmission circuit 25 in FIG. 1) for outputting the multiplexed television broadcast signal.

The television receiver according to the third aspect of the invention comprises display means (e.g., CRT 36 in FIG. 2) for receiving and displaying text data signals extracted from the multiplexed television broadcast signal interleaving the text data signals associated with television broadcast programs and hyper text data signals corresponding to the text data signals; designation means (e.g., remote commander 13 in FIG. 3) for designating any one of the text data signals displayed by the display means; detection means (e.g., control microcomputer 34 in FIG. 2 carrying out step S21 in FIG. 4) for detecting the hyper text data signal corresponding to the text data signal designated by the designation means; and processing means (control microcomputer 34 in FIG. 2 executing step S22 in FIG. 4) for processing the television broadcast program corresponding to the detected hyper text data signal.

In preferred structure according to the invention, the television receiver further comprises storage means (e.g., hard disk drive 35 in FIG. 2) for storing the text data signals and the hyper text data signals.

FIG. 1 is a block diagram of a TV (television) transmitter 1 practiced as one embodiment of the invention. In FIG. 1, a TV signal generation circuit 21 generates an analog video signal and an analog audio signal (the two signals may be referred to as the audio-visual signal hereunder where necessary).

The text data signal associated with the TV program in question is generated by a text data signal generation circuit 22 and output to the multiplexer 24.

The hyper text data signal corresponding to the text data signal associated with the TV program is generated by a hyper text data signal generation circuit 23 and also output to the multiplexer 24.

The multiplexer 24 inserts the text data signal and its corresponding hyper text data signal onto predetermined horizontal scanning lines during vertical blanking intervals (VBI) for an analog video signal, whereby a single multiplexed television broadcast signal is obtained. Illustratively, the character multiplex broadcast (closed caption) feature for displaying characters corresponding to an audio signal as captions on the screen involves multiplexing the text data signal on the twenty-first scanning line during vertical blanking intervals. In like manner, hyper text data is multiplexed on scanning lines during other vertical blanking intervals of the video signal. The television broadcast signal thus multiplexed passes through the transmission circuit 25 to reach an antenna 2. From the antenna 2, the television broadcast signal is output on radio waves. That is, the text data signal, hyper text data signal and TV audio-visual signal are multiplexed onto a single television broadcast signal which is output from the antenna 2.

Figure 2:
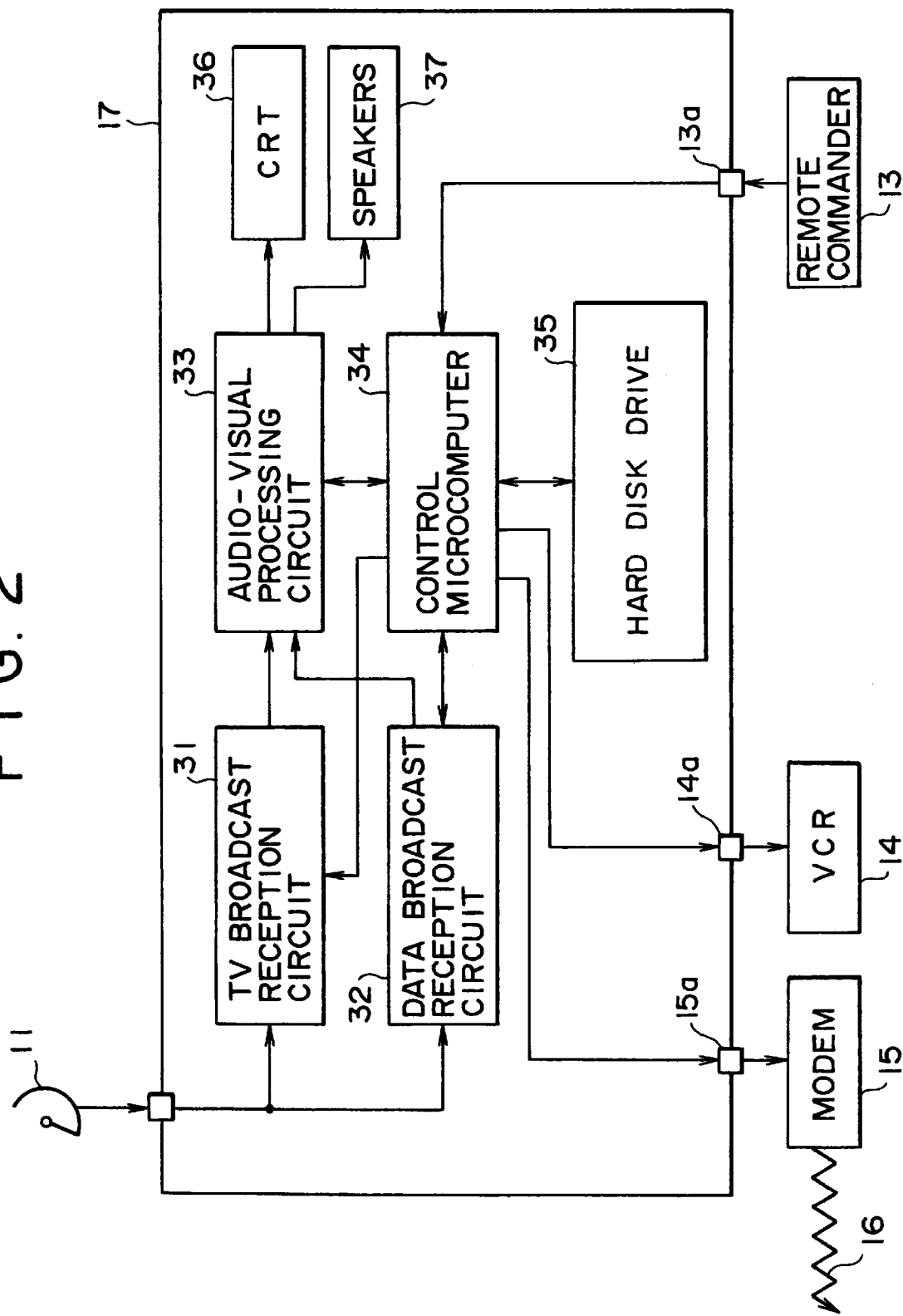
FIG. 2 is a block diagram of a TV receiver embodying the invention.

FIG. 2 is a block diagram of a television receiver practiced as another embodiment of the invention. In FIG. 2, an antenna 11 receives the television broadcast signal composed of the TV audio-visual signal, text data signal and hyper text data signal interleaved therein. The received television broadcast signal is input to a TV receiver 17.

A TV broadcast reception circuit 31 in the TV receiver 17 selects the TV broadcast signal designated by the control microcomputer 34. The designated TV broadcast signal is extracted from among a plurality of TV broadcast signals before being demodulated. The resulting audio-visual signal is output to an audio-visual processing circuit 33. In this manner, the user-designated TV program is selected and extracted by the TV broadcast reception circuit 31 from available TV broadcast signals.

A data broadcast reception circuit 32 selects and demodulates the text data signal (closed caption signal) included in the TV broadcast signal designated by the control microcomputer 34. After demodulation, the selected text data signal is output to the audio-visual processing circuit 33. The user-designated character broadcast (text data signal) is selected and extracted in this manner by the data broadcast reception circuit 32 from available TV broadcast signals.

A text data signal for program guide control (as EPG) and control data signals constituted by the hyper text data signal corresponding to the text data signal in question are multiplexed onto redetermined horizontal scanning lines of the video signal when transmitted. For this reason, it is difficult to transmit a large number of control data signals at any one time. These control data signals are transmitted by use of timings different from those for TV audio-visual signals. The data broadcast reception circuit 32 in the TV receiver 17 extracts and demodulates the control data signals thus transmitted. After such extraction and demodulation, the control data signals are forwarded by the control microcomputer 34 to the hard disk drive 35 for storage therein. The stored control data signals are read as needed from the hard disk drive 35 and processed. Illustratively, a TV broadcast station may output a TV broadcast signal having such control data signals multiplexed therein during the late hours after the day's programs have ended so that the TV receiver 17 will store the received control data signals into the hard disk drive 35.

The audio-visual processing circuit 33 processes the video signal received from the TV broadcast reception circuit 31 and accordingly generates a video signal to be supplied to the CRT 36. In addition, the audio-visual processing circuit 33 has the TV video signal multiplexed with the text data signal (closed caption signal) from the data broadcast reception circuit 33 or with a video data signal from the control microcomputer 34. The multiplexed video signal is output to the CRT 36.

Furthermore, the audio-visual processing circuit 33 performs appropriate processing such as amplification on the audio signal from the TV broadcast reception circuit 31. The processed audio signal is output to speakers 37.

An infrared ray TV operation signal from the remote commander 13 is processed by an infrared ray receiving unit 13a and by the control microcomputer 34. As a result of the signal processing, the control microcomputer 34 outputs instructions telling the TV broadcast reception circuit 31 to select and demodulate the designated TV audio-visual signal; the control microcomputer 34 may also issue instructions causing the data broadcast reception circuit 32 to select and demodulate the text data signal (closed caption signal).

The remote commander 13 outputs a signal that designates program guide display (i.e., the signal output by operation of a program guide key 41 in FIG. 3, to be described later with reference to that figure), upon receipt of the designating signal, the control microcomputer 34 generates a picture data signal (home page display data signal) corresponding to the control data signal read from the hard disk drive 35. The picture data signal thus generated is output to the audio-visual processing circuit 33.

When the signal for designating program guide display is sent from the remote commander 13 and input to the control microcomputer 34, the control microcomputer 34 performs various operations using the control data signal read from the hard disk drive 35. One such operation involves transmitting a control signal for executing the process corresponding to the designating signal to a VCR (video cassette recorder) via an infrared ray emitting unit 14a or to a modem 15 via a connector 15a. Another operation by the control microcomputer 34 involves generating the picture data signal and outputting it to the audio-visual processing circuit 33.

When the user turns off the power switch (not shown) of the TV receiver 17, the TV channel being output at that point is retained in a nonvolatile memory (not shown) inside the control microcomputer 34. Next time the user turns on the power switch of the TV receiver 17, an audio-visual output is made of the TV channel recorded in the control microcomputer 34.

FIG. 3 is a schematic view of a typical operation unit of the remote commander 13. The operation unit includes the program guide key 41, up-down-right-left keys 42 through 45, an enter key 46, numerical keys 47 and a character broadcast key 48.

The TV receiver 17 shown in FIG. 2 operates in one of two modes: TV operation mode and program guide mode. In the TV operation mode, the TV receiver 17 operates as a related art TV set manipulated in traditional fashion. In the program guide mode, the TV receiver 17 operates using hyper text data signals.

The program guide key 41 is a key for switchover between the program guide mode and the TV operation mode. Pushing once the program guide key 41 replaces the TV operation mode with the program guide mode or vice versa.

In the TV operation mode, the desired TV program together with its character broadcast is selected by use of the up-down keys 42 and 43, numerical keys 47 and character broadcast key 48. Illustratively, by pushing once the up key 42 (or down key 43), the user selects the TV program on the next (or preceding) channel. Alternatively, pushing any one of the numerical keys 47 selects the TV program on the channel corresponding to the number of the pushed key. Pushing once the character broadcast key 48 selects the text data signal (closed caption signal) multiplexed in the audio-visual signal of the TV program on the currently selected channel, whereby text characters are displayed on the screen.

In the program guide mode, the user first invokes a GUI-based selection screen for selecting the manner in which to control the TV receiver 17. Operating the up-down-left-right keys 42 through 45, the user moves the cursor through the screen fields indicating various control features. When the desired control feature is selected, the user pushes the enter key 46 to finalize the selection.

Described below with reference to FIG. 4 and subsequent figures are typical operations performed on the operation unit, the internal processes executed in response to the performed operations, and the concomitant display screens.

Figure 4A:
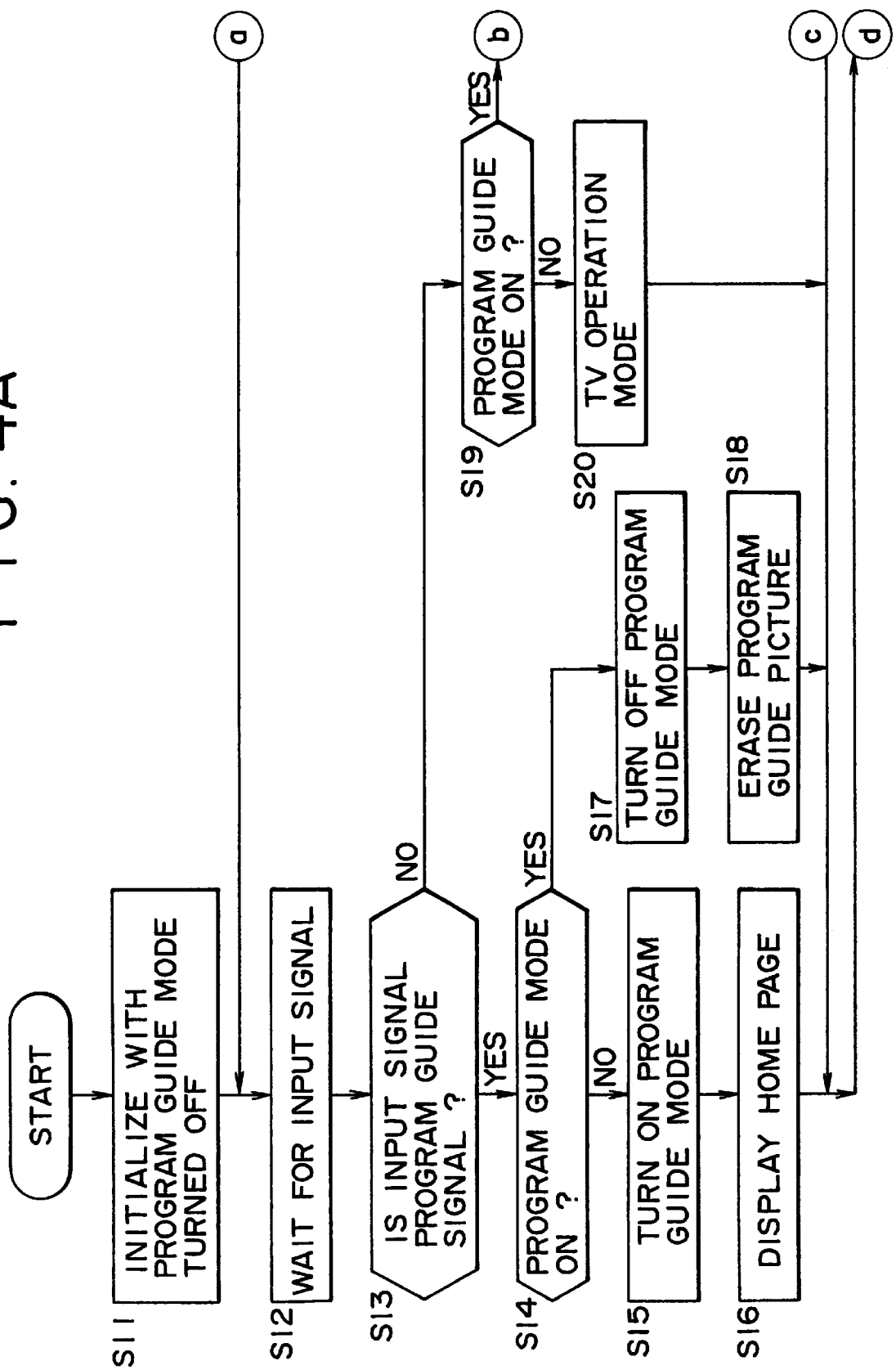

FIG. 4 is a flowchart of steps in which the TV receiver 17 operates. How the TV receiver 17 works in the TV operation mode will now be described.

The user activates the TV receiver 17 by pushing its power switch, not shown. This causes step S11 of FIG. 4 to be reached, and the TV receiver 17 is initialized to the TV operation mode. In this state, the memory in the control microcomputer 34 retains the receiver status in effect when the power switch was last turned off. Thus the TV program on the most recently selected channel is output visually and audibly by default as soon as the TV operation mode is selected.

In step S12, an input signal from the user is awaited. That is, the TV program on the channel initially set in step S11 remains output visually and audibly until a designating signal is entered by the user.

In this state, the user pushes once the up key 42 on the operation unit in 3, in order to select a given TV program. This causes the remote commander 13 to output a designating signal to the TV receiver 17.

Upon receipt of the designating signal, the TV receiver 17 leaves the input signal wait process in step S12 and reaches step S13. In step S13, the control microcomputer 34 in the TV receiver 17 checks to see if the input signal is a signal produced by operation of the program guide key 41 in FIG. 3. In this case, the input signal is a TV operation signal that designates selection of a TV program and is judged by the control microcomputer 34 to be other than the designating signal from the program guide key 41. The control microcomputer 34 thus reaches step S19.

In step S19, a check is made to see if the program guide mode is established. Since the TV receiver is currently operating in the TV operation mode, the program guide mode is judged to be absent. Step S19 is thus followed by step S20.

In step S20, the control microcomputer 34 outputs an instruction signal telling the TV broadcast reception circuit 31 to select the TV program on the user-designated channel (the next channel in this case) in accordance with the designating signal from the user. Given the instruction, the TV broadcast reception circuit 31 extracts and demodulates the signal of the designated TV program and transmits the audio-visual signal of that program to the audio-visual processing circuit 33. The audio-visual processing circuit 33 processes the received audio-visual signal and provides an audio-visual output accordingly.

After the user-selected TV program is output, step S12 is again reached and the next input signal is awaited. In this manner, as the user operates the TV receiver 17, steps S12, S13, S19 and S20 in FIG. 4 are carried out repeatedly in the TV operation mode.

The steps for processing the output text data signal (closed caption signal) proceed likewise. For example, pushing the character broadcast key 48 in FIG. 3 causes the remote commander 13 to output a signal designating the display of text characters corresponding to the currently selected TV program. When the TV receiver 17 receives the designating signal, the input signal wait process in step S12 is canceled and step S13 is reached. In step S13, the input signal is judged to be other than the signal for establishing the program guide mode. Step S13 is followed by step S19 in which the program guide mode is judged to be inactive. After the judgment, step S20 is reached.

In step S20, the control microcomputer 34 outputs to the data broadcast reception circuit 32 an instruction signal designating the selection and demodulation of the text data signal corresponding to the user-designated program (i.e., the TV program currently output audibly and visually) in accordance with the designating signal from the user. Given the instruction signal, the data broadcast reception signal 32 selects and demodulates the text data signal corresponding to the designated program, and forwards the resulting text data signal to the audio-visual processing circuit 33. In turn, the audio-visual processing circuit 33 multiplexes the text data signal onto the TV video signal and outputs the multiplexed signal to the CRT 36. In response, the CRT 36 outputs the character broadcast selected by the user.

Described below are the workings of the program guide mode using the hyper text data signal.

When the user pushes once the program guide key 41 in FIG. 3, the remote commander 13 outputs a signal for designating the establishment of the program guide mode.

When the TV receiver 17 receives the designating signal, the input signal wait process in step S12 of FIG. 4 is canceled and step S13 is reached. In step S13, the input signal is judged to be the signal for establishing the program guide mode. Step S13 is followed by step S14 in which a check is made to see if the program guide mode is already selected. Since the program guide mode is yet to be selected in this case, step S15 is reached. In step S15, the control microcomputer 34 turns on the program guide mode. Thereafter, the TV receiver 17 operates in the program guide mode using the hyper text data signal.

In step S16, the control microcomputer 34 reads from the hard disk drive 35 the control data signal (i.e., made of the text data signal and the hyper text data signal corresponding thereto) for home page display, generates a home page picture data signal corresponding to that control data signal, and outputs the picture data signal to the audio-visual processing circuit 33.

The audio-visual processing circuit 33 multiplexes the picture data signal onto the currently output TV video signal, and outputs the multiplexed signal to the CRT 36. The CRT 36 outputs the home page screen, such as one illustrated in FIG. 5.

Figure 5:
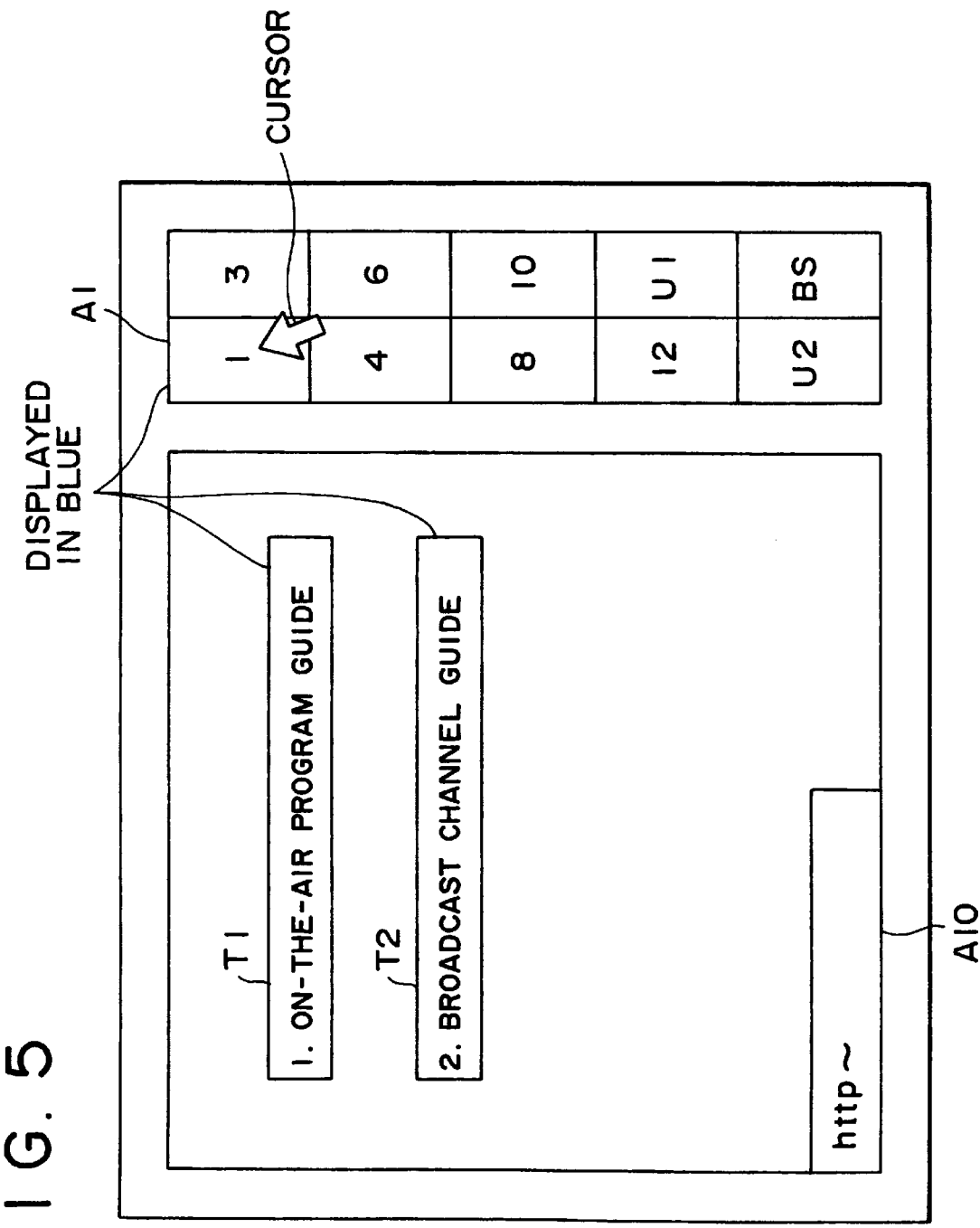
FIG. 5 is a view of a typical home page screen displayed on the CRT when the program guide key of the remote commander in FIG. 3 is pushed.

The home page in FIG. 5 includes a text T1, a text T2, a TV program area A1 and a URL display area A10 all using hyper texts.

The HTML (Hyper Text Markup Language) in such texts will now be described. The HTML is a language in which to describe hyper texts. Using the HTML involves having the qualification of characters, itemization and line feeds expressed by commands called tags embedded in the text. In addition, reading a URL (Uniform Resource Locator) as an anchor tag associated with a given text links that text to the home page designated by the URL.

It is possible to call up various information files from the linked texts by use of dedicated software called the browser. The files may be called up freely from the texts not only from the hard disk drive on the client side but also from servers over a network. This is the biggest feature of the HTML. One of the well-known browsers is the software called MOSAIC first developed at the National Center for Supercomputing Application (NCSA) of the University of Illinois.

The World Wide Web (WWW) of the Internet is a system that uses the HTML. MOSAIC and other programs work as the browser for the HTML on the Internet, allowing files in WWW servers all over the world to be called up and displayed in real time.

In the WWW system used on the Internet, the WWW servers connected to the network are assigned network addresses (domain information) called the URL (Uniform Resource Locator). When a tag describing the associated URL is attached to the text written in HTML, files in the URL-designated WWW server can be linked to the text in question.

Illustratively, simply pointing the cursor to the text linked to a file in a WWW server and clicking the button of the pointing device transfers the linked file from the WWW server to the client so that the home page of the WWW server is displayed on the client side. Thus the WWW system using the HTML allows any of the WWW servers on the network to be readily accessed and permits handling of various kinds of data such as images, voices, texts and animations.

Returning to FIG. 5, the text T1, text T2 and TV program area A1 are each composed of a hyper text in which the associated file is linked to the text characters using the HTML. These texts are displayed illustratively in blue, as opposed to the ordinary text characters (i.e., to which no file is linked) displayed in black.

The text T1 denotes a hyper text to which is linked a file for displaying an on-the-air program guide. The text T2 represents a hyper text to which is linked a file for displaying a broadcast channel guide.

The TV program area A1 denotes a hyper text in which the texts indicated by 1, 3, 4, 6, 8, 10, 12, U1, U2 and BS are each linked to a file for displaying the contents of the TV program on the channel corresponding to the numeral in question.

The URL display area A10 is an area indicating the name of the file linked to the text characters in the hyper text designated by the cursor.

In FIG. 5, the cursor is set to the position "1" representing TV channel No. 1 in the TV program area A1. The name of the file linked to the text in that cursor position is displayed in the URL display area A10.

The up-down-left-right keys 42 through 45 may be operated to set the cursor to any one of the channel positions indicated by 1, 3, 4, 6, 8, 10, 12, U1, U2 and BS in the TV program area A1. The cursor-designated channel is selected by pushing the enter key 46, and the program on the selected channel is output visually and audibly. This process takes place more specifically as follows:

Suppose that in the screen of FIG. 5, the user pushes once the right key 45 in FIG. 3. This causes the remote commander 13 to output a signal designating cursor movement.

When the designating signal is received by the TV receiver 17, the input signal wait process of step S12 in FIG.

4 is canceled and step S13 is reached. In step S13, the input signal is judged to be other than the signal designating the establishment of the program guide mode. Step S13 is followed by step S19 in which the program guide mode is judged to be on. The decision in step S19 is followed by step S21.

In step S21, a check is made to see if the input signal is an HTML process signal (signal produced by the enter key) or a cursor position update signal (signal generated by any one of the up-down-left-right keys). In this case, the input signal is judged to be a cursor position update signal since it is produced by operation of the right key 45. Step S21 is followed by step S23.

In step S23, the control microcomputer 34 generates a picture data signal representing a cursor display in which the cursor position is shifted right one place. In addition, the control microcomputer 34 acquires the name of the file linked to the destination text characters (text indicated by numeral 3 in the TV program area A1 in this case) from the control data signals stored in the hard disk drive 35, generates picture data signals to be displayed in the URL display area A10, and outputs these picture data signals to the audio-visual processing circuit 33. In turn, the audio-visual processing circuit 33 multiplexes the received picture data signals onto the video signal being output, and sends the multiplexed signal to the CRT 36.

As a result, the cursor is moved to the position 3 indicating TV channel No. 3 in the TV program area A1, and the picture data is output whereby the name of the file linked by the HTML to the cursor position is displayed in the URL display area A10. By operating the up-down-left-right keys 42 through 45, the user is thus able to move freely the cursor to the desired characters written in HTML.

In the above state (in which the cursor is set to the position 3 denoting TV channel No. 3 in the TV program area A1), the user pushes the enter key 46 in FIG. 3. This causes the remote commander 13 to output a designating signal that finalizes the selection.

When the designating signal is received by the TV receiver 17, the input signal wait process of step S12 in FIG. 4 is canceled. Step S12 is followed by steps S13, S14 and S21 in that order.

In step S21, the control microcomputer 34 judges the type of the input signal. In this case, the input signal is judged to be an HTML process signal since it is a signal causing the HTML process to be designated by operation of the enter key 46. Step S21 is followed by step S22 in which the HTML process is carried out.

In step S22, the control microcomputer 34 reads from the hard disk drive 35 the corresponding file (i.e., file based on control data signals), and processes the acquired file. In this case, the processing of the file involves effecting an audio-visual output of the TV program on channel No. 3. The control microcomputer 34 supplies the TV broadcast reception circuit 31 with an instruction for selecting and demodulating the audio-visual signal on TV channel No. 3, whereby the TV audio-visual output is executed. Thereafter the control microcomputer 34 turns off the program guide mode to let the TV receiver 17 operate in the TV operation mode.

The state in which the home page screen of FIG. 5 is output is again restored. By operating the up-down-left-right keys 42 through 45, the user sets the cursor to the position of the text T1. Pushing the enter key 46 executes the on-the-air TV program guide. This process takes place more specifically as follows:

In the state of the screen in FIG. 5, the user operates the up-down-left-right keys 42 through 45 to position the cursor to the text T1, and pushes the enter key 46. This causes the remote commander 13 to output the signal designating that the selection be finalized.

When the TV receiver 17 receives the designating signal, the input signal wait process in step S12 of FIG. 4 is canceled. Step S12 is followed by steps S13, S19, S21 and S22 in that order.

In step S22, the control microcomputer 34 reads the corresponding file from the hard disk drive 35 and processes the acquired file. In this case, the processing of the file involves displaying the on-the-air program guide (i.e., a process in which the subsequent layered selection screen is displayed). Using the file, the control microcomputer 34 generates a picture data signal of the next screen to be displayed and supplies the audio-visual processing circuit 33 with that signal. In turn, the audio-visual processing circuit 33 multiplexes the picture data for video signal output.

In the manner described, the user operates the up-down-left-right keys 42 through 45 and the enter key 46 in the home page of FIG. 5. When the text T1 ("1. ON-THE-AIR PROGRAM GUIDE") is selected, the screen of FIG. 6 is displayed.

Figure 6:
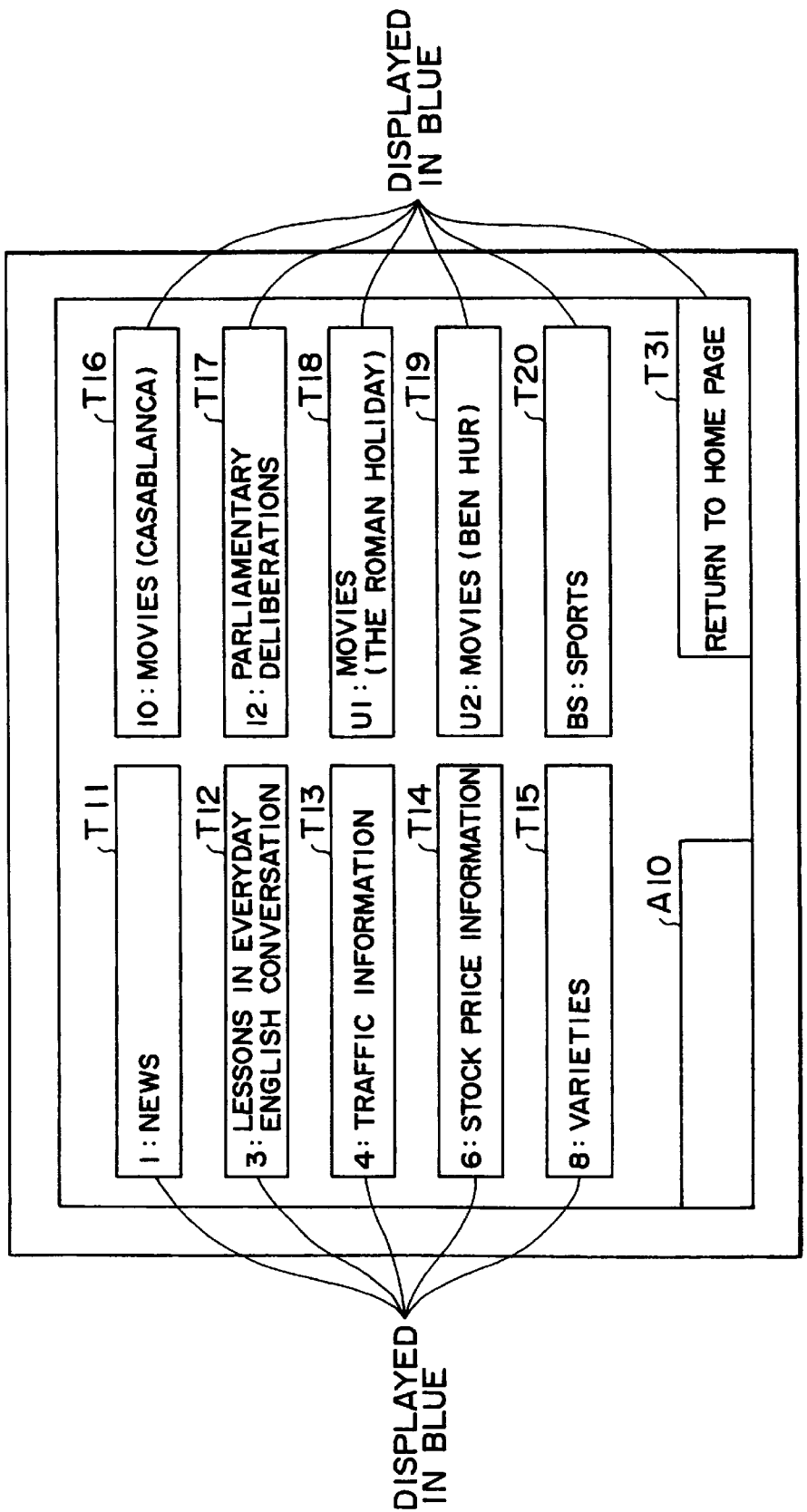
FIG. 6 is a view of a screen that appears when the text T1 in the home page screen of FIG. 5 is selected.

The screen in FIG. 6 shows a typical on-the-air TV program guide. Operating the up-down-left-right keys 42 through 45, the user moves the cursor to any one of the TV programs indicated by texts T11 through T20. With the cursor set to the desired text position in this selection screen, pushing the enter key 46 allows the to user to obtain detailed information on the corresponding program.

The text T31 in the bottom right corner of the screen in FIG. 6 is a hyper text to which the cursor may be positioned by operation of the up-down-left-right keys 42 through 45. With the cursor set to the text T31, pushing the enter key 46 causes the home page screen of FIG. 5 to reappear.

Suppose that in the screen state of FIG. 6, the user positions the cursor to the text T12 (lessons in everyday English conversation currently broadcast on channel No. 3) by operating the up-down-left-right keys 42 through 45, and then pushes the enter key 46. This causes the remote commander 13 to output the signal designating that the selection be finalized.

When the TV receiver 17 receives the designating signal, the input signal wait process in step S12 of FIG. 4 is canceled. Step S12 is followed by steps S13, S19, S21 and S22 in that order.

In step S22, the control microcomputer 34 reads the corresponding file from the hard disk drive 35 and processes the acquired file. In this case, the processing of the file involves displaying details of the lessons in everyday English conversation being offered on channel No. 3 (i.e., a process in which the subsequent layered selection screen is displayed). Using the file, the control microcomputer 34 generates the picture data signal of the next screen to be displayed, and supplies the audio-visual processing circuit 33 with that signal. In response, the audio-visual processing circuit 33 multiplexes the picture data for video signal output.

In the manner described, the user operates the up-down-left-right keys 42 through 45 and the enter key 46 in the selection screen of FIG. 6. When the text T12 is selected, the screen of FIG. 7 is displayed.

Figure 7:
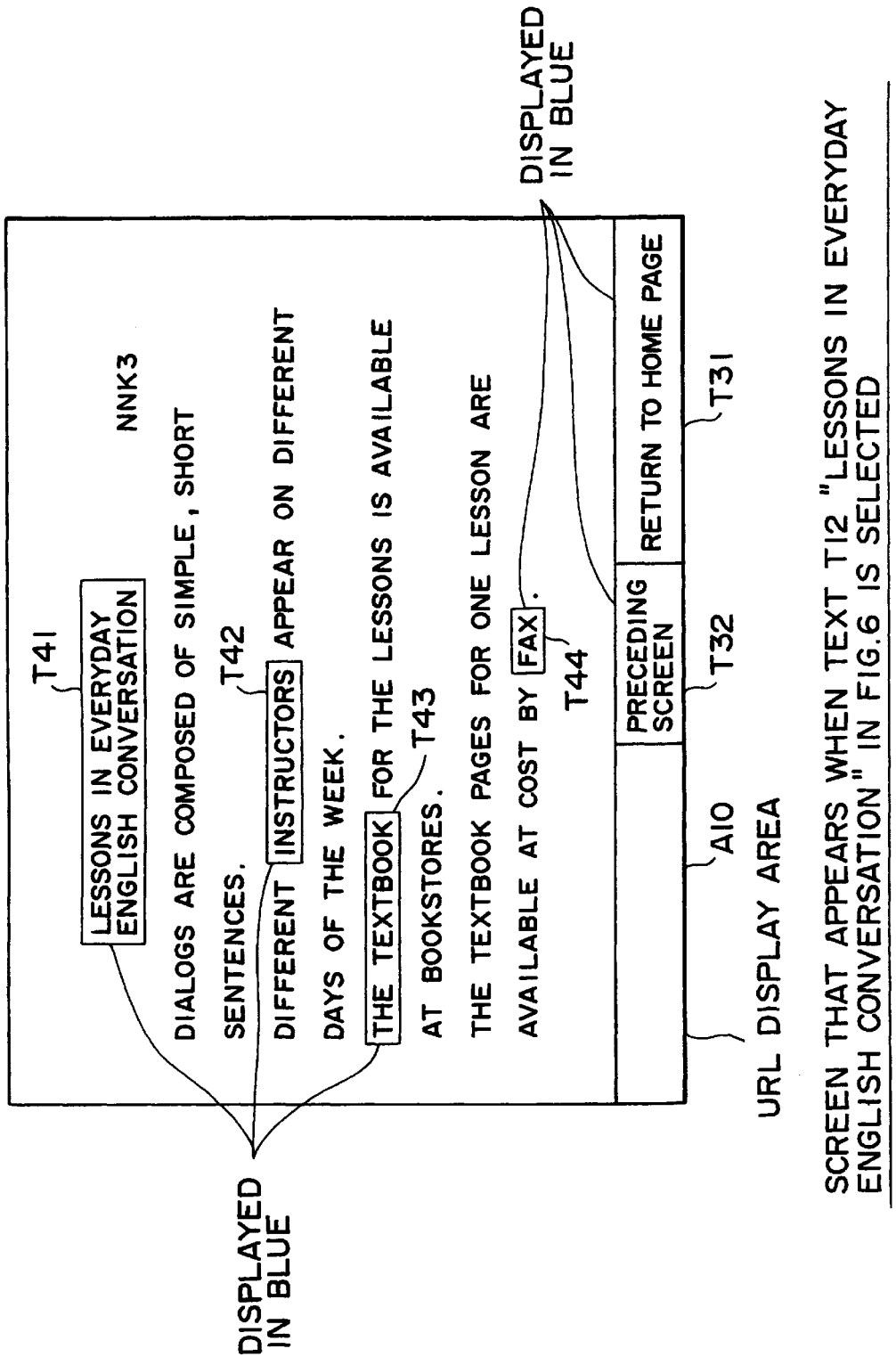
FIG. 7 is a view of a screen that appears when the text T12 in the display screen of FIG. 6 is selected.

The screen in FIG. 7 shows detailed information on the program being broadcast on channel No. 3. The text T32 in the bottom center of the screen in FIG. 7 is a hyper text to which the cursor may be positioned by operation of the up-down-left-right keys 42 through 45. With the cursor set to the text T32, pushing the enter key 46 causes the immediately preceding screen (screen of FIG. 6) to reappear.

In the screen of FIG. 7, the text T41 "Lessons in Everyday English Conversation," text T42 "instructors," text T43 "The textbook" and text T44 "fax" are hyper text characters linked to the associated files. These text characters are displayed in blue as distinct from the other ordinary text characters in black.

Figure 8:
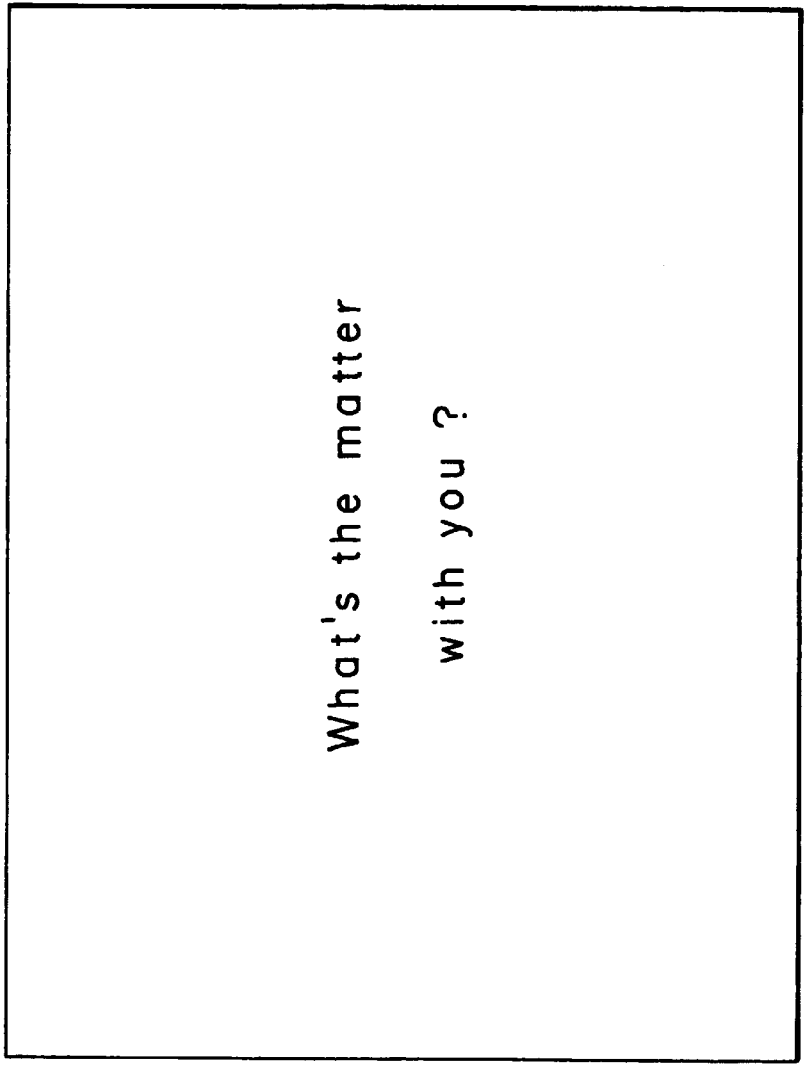
FIG. 8 is a view of a screen that appears when the text T41 in the display screen of FIG. 7 is selected.

The screen of FIG. 8 appears when, in the screen state of FIG. 7, the user operates the up-down-left-right keys 42 through 45 to position the cursor to the text T41 (Lessons in Everyday English Conversation) and then pushes the enter key 46. In this case, the TV receiver 17 operates in the same manner as it did when channel No. 3 in the TV program area A1 in the screen of FIG. 5 was selected, and thus the workings of the TV receiver 17 will not be described further.

The screen shown in FIG. 8 indicates a video output of the TV program on channel No. 3. Needless to say, the speakers 37 at this time are effecting an audio output of the TV program on channel No. 3.

The screen of FIG. 9 appears when, in the screen state of FIG. 7, the user operates the up-down-left-right keys 42 through 45 to position the cursor to the text T42 (instructors) and then pushes the enter key 46. In this case, the TV receiver 17 operates in the same manner as it did when the text T1 in the screen of FIG. 5 was selected, and thus the workings of the TV receiver 17 will not be described further.

The screen shown in FIG. 9 indicates detailed information on the instructors in charge of the "Lessons in everyday English conversation" on TV channel No. 3.

Figure 10:
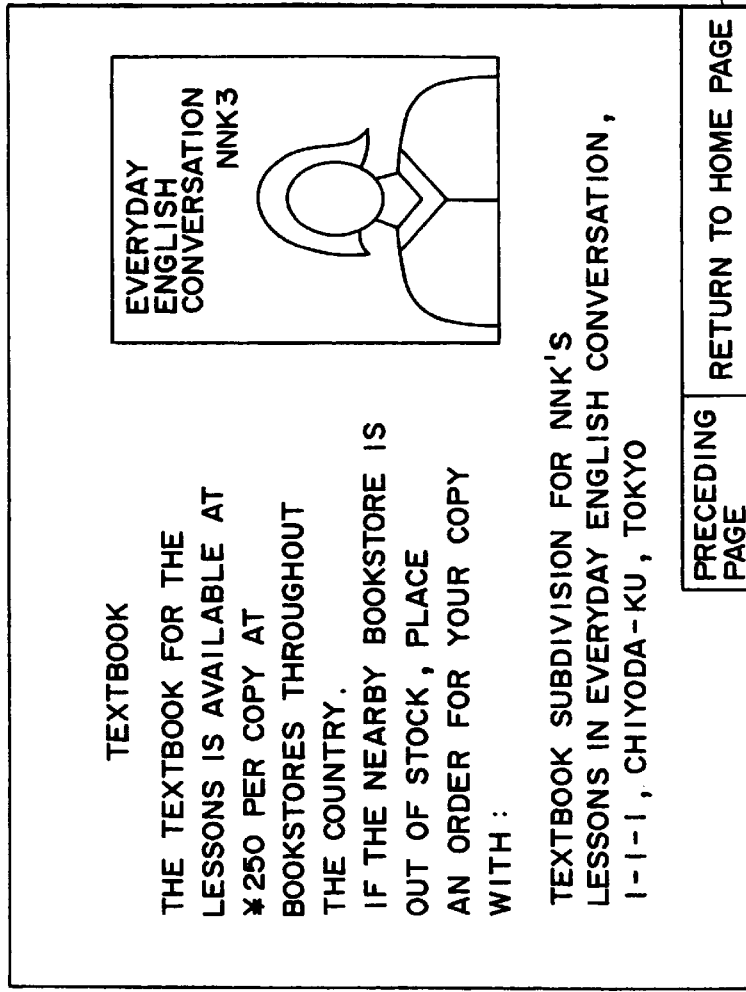
FIG. 10 is a view of a screen that appears when the text T43 in the display screen of FIG. 7 is selected.

The screen of FIG. 10 appears when, in the screen state of FIG. 7, the user operates the up-down-left-right keys 42 through 45 to position the cursor to the text T43 (The textbook) and then pushes the enter key 46.

The screen shown in FIG. 10 indicates detailed information on the textbook used in the program "Lessons in everyday English conversation" on TV channel No. 3.

Figure 11:
FIG. 11 is a view of a screen that appears when the text T44 in the display screen of FIG. 7 is selected.

The screen of FIG. 11 appears when, in the screen state of FIG. 7, the user operates the up-down-left-right keys 42 through 45 to position the cursor to the text T44 (fax) and then pushes the enter key 46.

The screen shown in FIG. 11 provides information on how to use the fax service whereby the user may obtain text pages for a session in the program "Lessons in Everyday English Conversation" on TV channel No. 3.

Suppose that in the screen state of FIG. 11, the user operates the up-down-left-right keys 42 through 45 in FIG. 3 to position the cursor to the text T51 (CHECK) and then pushes the enter key 46. This causes the remote commander 13 to output the signal designating that the selection be finalized.

When the TV receiver 17 receives the designating signal, the input signal wait state in step S12 of FIG. 4 is canceled. Step S12 is followed by steps S13, S19, S21 and S22 in that order.

In step S22, the control microcomputer 34 reads the corresponding file from the hard disk drive 35 and processes the acquired file. In this case, the processing of the file involves allowing the user to utilize the fax service. Using the file, the control microcomputer 34 transmits over a telephone line 16 a signal including the user's fax number and fax transmission request to the telephone number of the fax service provider. The operation effects automatic access to the fax service provider, allowing the user to take advantage of the fax service.

The state of the home page screen in FIG. 5 is again restored. With the screen of FIG. 5 on display, the user operates the up-down-left-right keys 42 through 45 to position the cursor to the text T2 (Broadcast channel guide), and pushes the enter key. This causes the screen of FIG. 12 to appear.

Figure 12:
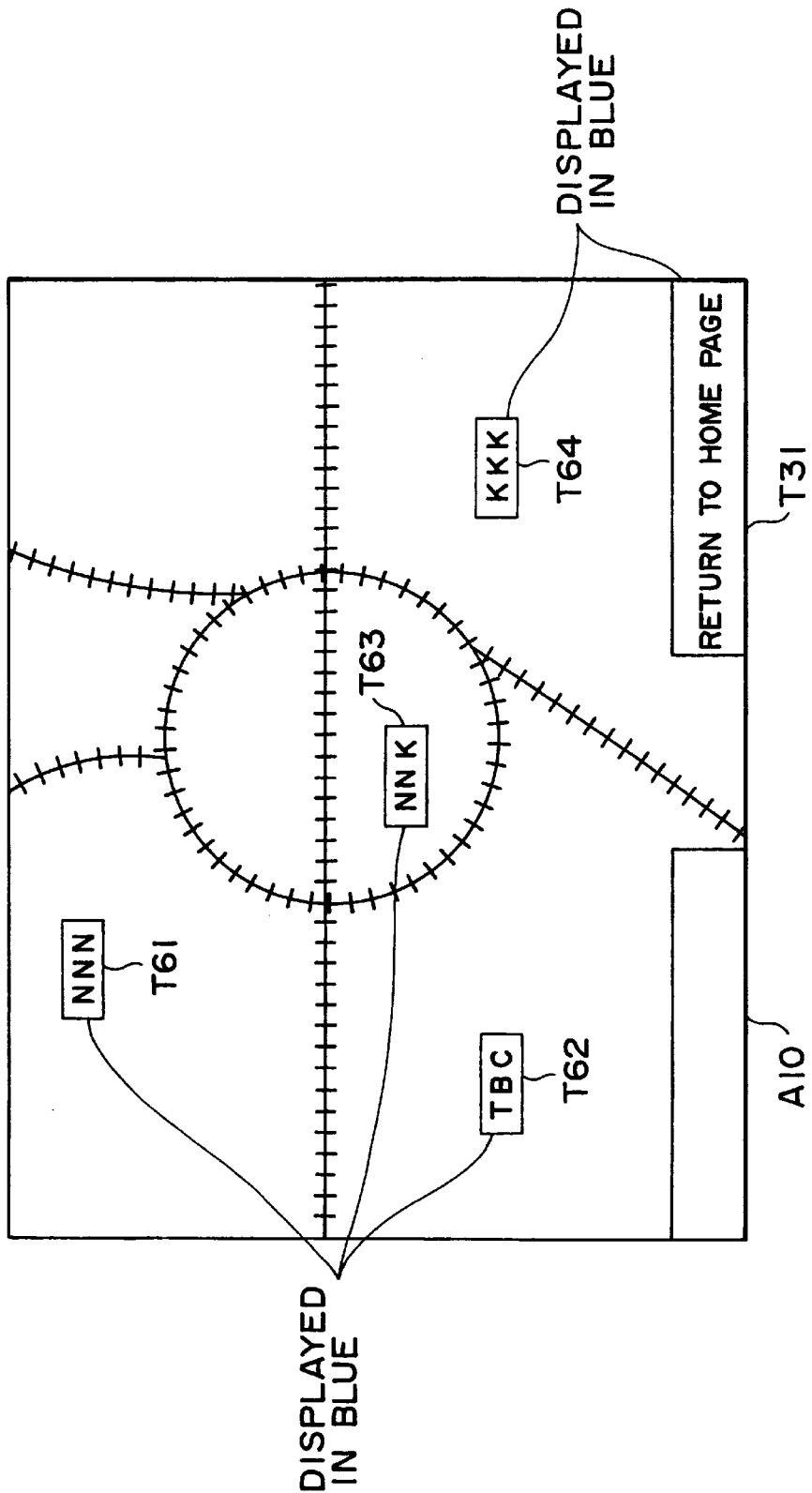
FIG. 12 is a view of a screen that appears when the text T2 in the home page screen of FIG. 5 is selected.

FIG. 12 shows a selection screen offering detailed information on the contents of broadcasts from various TV broadcast stations. As shown in FIG. 12, the selection screen indicates the geographical locations of such TV broadcast stations. The texts T61 through T64 representing the TV broadcast stations are linked to the associated files through the use of HTML.

Figure 13:
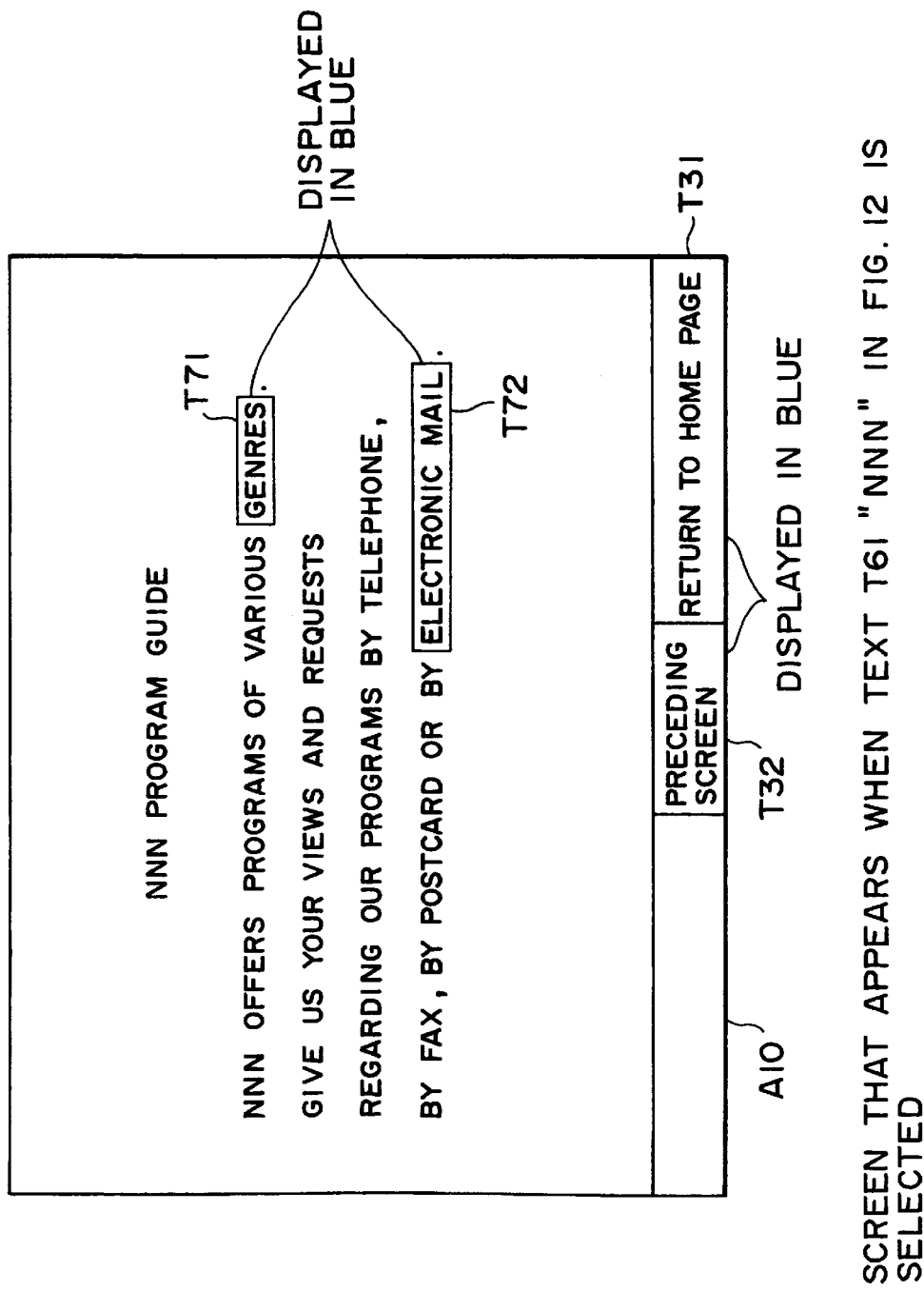
FIG. 13 is a view of a screen that appears when the text T61 in the display screen of FIG. 12 is selected.

FIG. 13 shows a program guide screen of the NNN broadcast station which appears when the user operates the up-down-left-right keys 42 through 45 in FIG. 3 to position the cursor to the text T61 (NNN) in FIG. 12 and then pushes the enter key 46.

As shown in FIG. 13, the screen includes a text T71 (genres) and a text T72 (electronic mail). These texts are hyper texts linked to the associated files by use of HTML.

The text T71 is a hyper text for executing a process of displaying detailed information on the genres of the programs broadcast by NNN (i.e., a process in which the subsequent layered selection screen is displayed). The text T72 is a hyper text which, when selected, displays an electronic mail input screen (not shown). After a message is entered, the hyper text electronically transmits the mail via the modem 15 to the NNN broadcast station.

Figure 14:
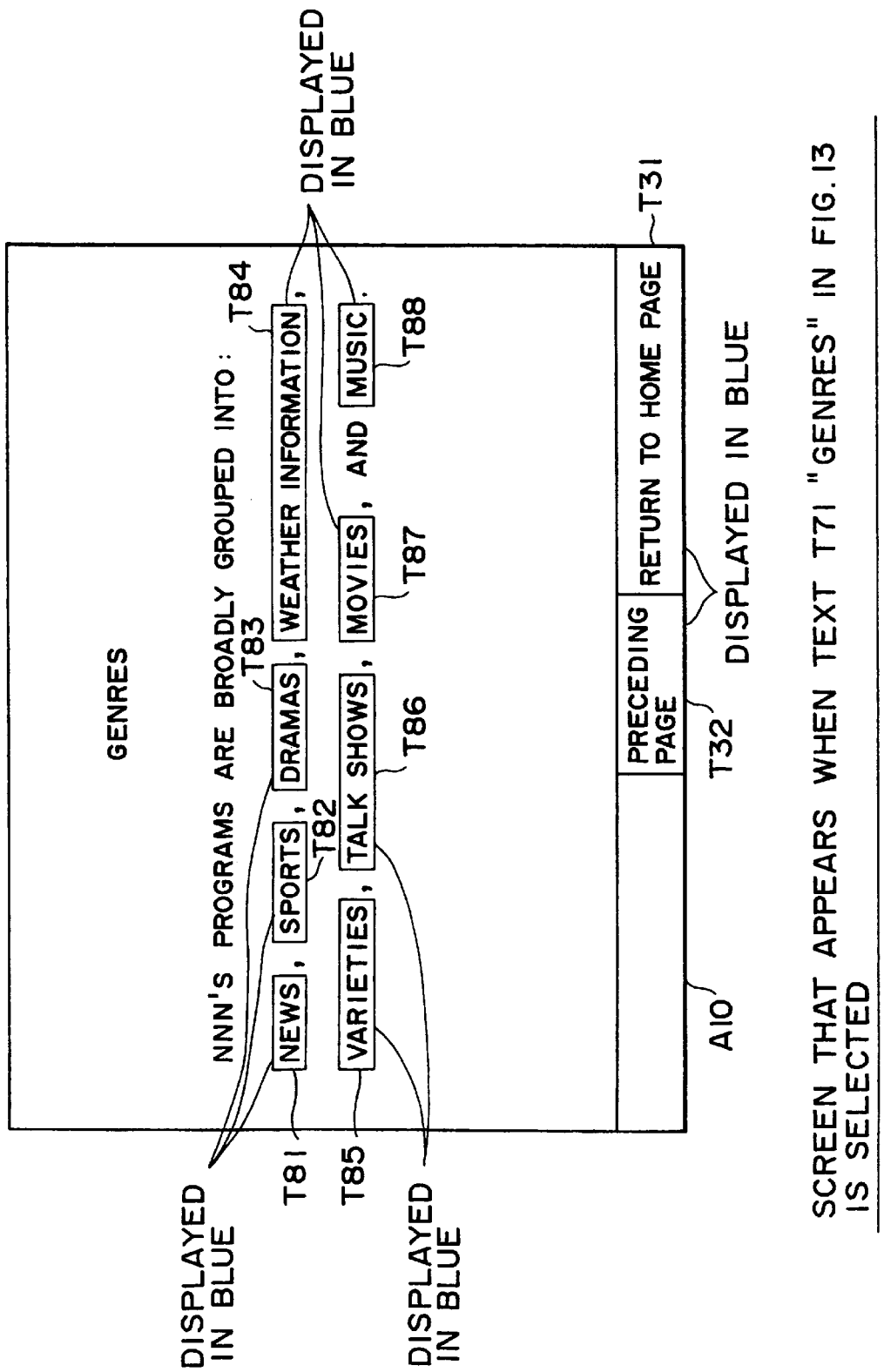
FIG. 14 is a view of a screen that appears when the text T71 in the display screen of FIG. 13 is selected.

The screen of FIG. 14 appears when the user operates the up-down-left-right keys 42 through 45 in FIG. 3 to position the cursor to the text T71 (genres) in FIG. 13 and then pushes the enter key 46. The screen provides information on the genres of the programs offered by the NNN broadcast station.

As shown in FIG. 14, the screen includes texts T81 through T88 related to the available genres and linked to files using HTML. Each of the texts T81 through T88 is a hyper text for displaying the subsequent layered selection screen.

Figure 15:
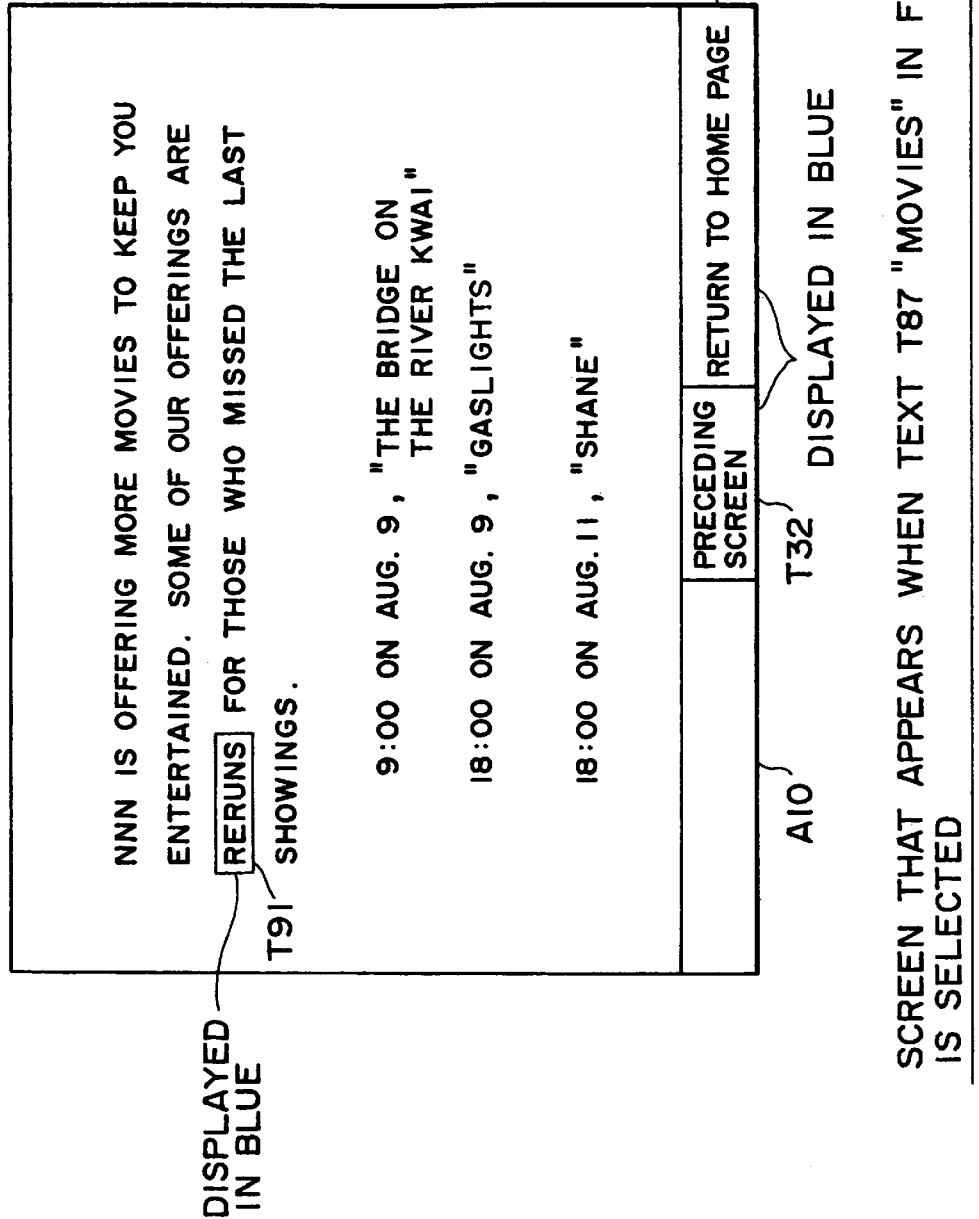
FIG. 15 is a view of a screen that appears when the text T87 in the display screen of FIG. 14 is selected.

The screen of FIG. 15 appears when the user operates the up-down-left-right keys 42 through 45 in FIG. 3 to position the cursor to the text T87 (movies) in FIG. 14 and then pushes the enter key 46. The screen provides information on the movie programs offered by the NNN broadcast station.

As indicated in FIG. 15, the screen includes a text T91 (reruns) related to movie reruns and linked to files through the use of HTML. The text T91 is a hyper text for displaying the subsequent layered selection screen.

Figure 16:
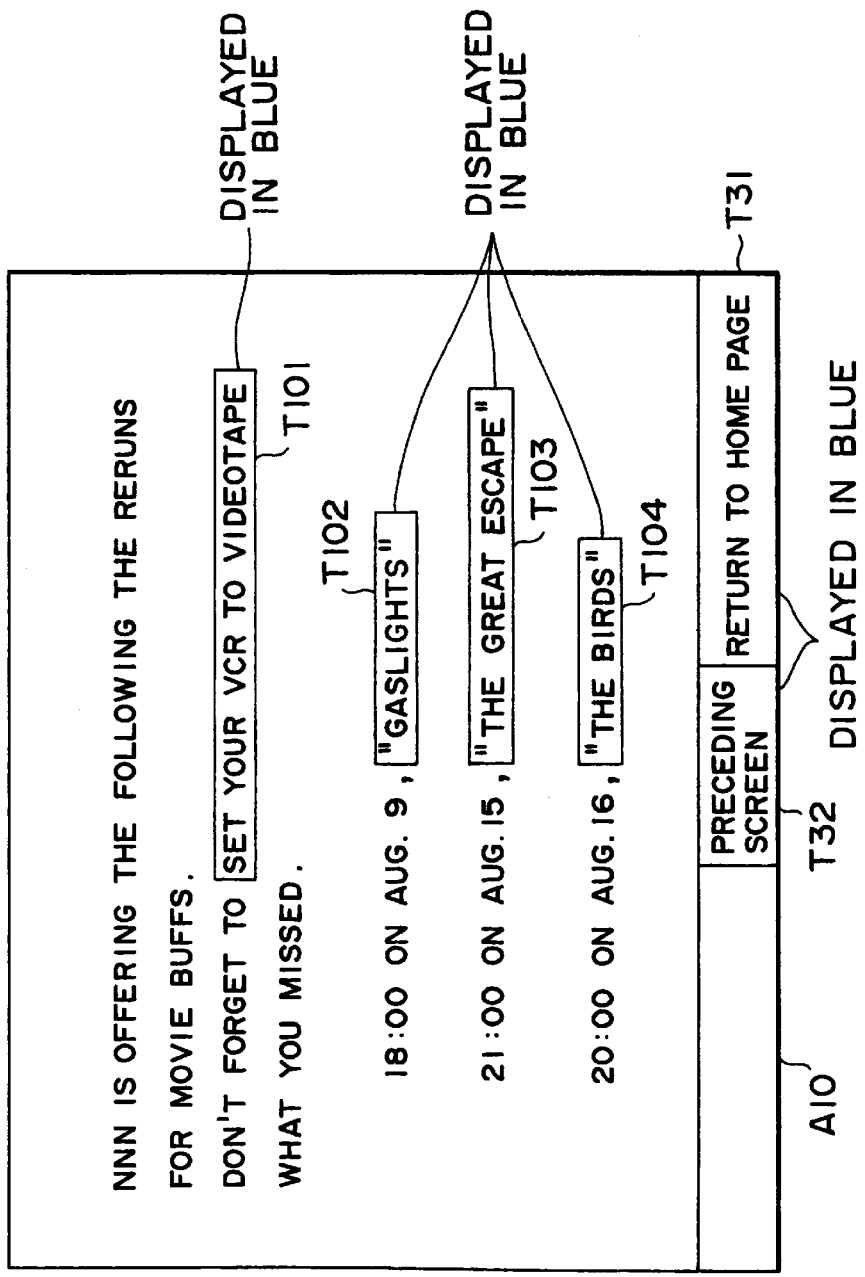
FIG. 16 is a view of a screen that appears when the text T91 in the display screen of FIG. 15 is selected.

The screen of FIG. 16 appears when the user operates the up-down-left-right keys 42 through 45 in FIG. 3 to position the cursor to the text T91 (reruns) in FIG. 15 and then pushes the enter key 46. This screen is a selection screen allowing the user to set the VCR automatically to videotape any one of the movie programs offered by the NNN broadcast station.

As depicted in FIG. 16, the screen includes texts T101 through T104 linked to files using HTML in connection with the automatic setting of the VCR for videotaping. The text T101 is a hyper text for displaying the subsequent layered selection screen, and the texts T102 through T104 are each a hyper text for automatically setting the VCR to videotape the desired program.

Figure 17:
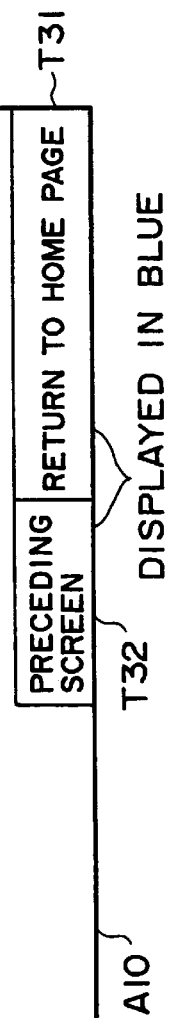
FIG. 17 is a view of a screen that appears when the text T101 in the display screen of FIG. 16 is selected.

The screen of FIG. 17 appears when the user operates the up-down-left-right keys 42 through 45 to position the cursor to the text T101 in FIG. 16 and then pushes the enter key 46. This screen displays instructions for setting the VCR to videotape.

Suppose that again in the screen of FIG. 16, the user operates the up-down-left-right keys 42 through 45 to position the cursor to the text T102 and then pushes the enter key 46. In this case, the VCR 14 is automatically set to videotape the movie entitled "Gas Lights" to be broadcast starting at 18:00 on August 9 by the NNN broadcast station.

The process above takes place more specifically as follows: when the user sets the cursor onto the text T102 and pushes the enter key 46, the remote commander 13 outputs the signal designating that the selection be finalized.

When the TV receiver 17 receives the designating signal, the input signal wait process in step S12 of FIG. 4 is canceled. Step S12 is followed by steps S13, S19, S21 and S22 in that order.

In step S22, the control microcomputer 34 reads the corresponding file from the hard disk drive 35 and processes the acquired file. In this case, the processing of the file involves automatically setting the VCR for videotaping. Using the file, the control microcomputer 34 outputs to the VCR 14 via the infrared ray emitting unit 14a an instruction signal telling the machine to videotape a three-hour movie broadcast by the NNN broadcast station on August 9 starting at 18:00. The operation automatically sets the VCR 14 to videotape the desired program.

To switch from the program guide mode to the ordinary TV operation mode, the user pushes the program guide key 41 in FIG. 3 with the program guide mode kept on. This causes steps S12, S13 and S14 in FIG. 4 to be carried out in that order. In step S14, a check is made to see if the program guide mode is in effect. In this case, the program guide mode is judged to be in effect and step S17 is reached. In step S17, the program guide mode is turned off. In step S18, the control microcomputer 34 stops outputting the picture data signal to the audio-visual processing circuit 33 and switches to the ordinary TV operation mode. In this manner, simply pushing the program guide key 41 replaces the program guide mode with the TV operation mode.

The files linked to texts through the use of HTML may either be files held in the TV receiver 17 (e.g., files stored in the hard disk drive 35 in the above example) or files in other servers on the network (e.g., files in WWW servers on the Internet). How a file in a WWW server (access point) on the Internet is accessed is described below.

For example, suppose that the file linked to the text selected by the remote commander 13 is a file (described in HTML and designated by URL) held in a WWW server on the Internet. In that case, the control microcomputer 34 performs dial-up IP connection based on the PPP (Point to Point Protocol) so as to access the URL of the linked destination. Specifically, the control microcomputer 34 outputs a connection control signal (made up of the telephone number and ID number for connecting to a previously registered Internet service provider) to the modem 15 via the connector 15a in accordance with previously established procedures. The modem 15 converts the connection control signal to a predetermined frequency signal based on telephone line protocols, and outputs the converted signal onto the telephone line 16.

When dial-up IP connection with the PPP server of the Internet service provider is completed and connection to the Internet is provided via the PPP provider, access is started to the corresponding WWW server based on the URL of the linked destination. The access causes the URL-designated home page or other applicable HTML file to be transferred from the WWW server via the service provider and telephone line 16 to the modem 15. After demodulation, the file is stored temporarily into the hard disk drive 35 by way of the control microcomputer 34. The control microcomputer 34 reads and processes the temporarily stored HTML file to generate a picture data signal representing the home page or the like, and outputs the signal to the audio-visual processing circuit 33. The audio-visual processing circuit 33 multiplexes the generated picture data signal to output a video signal. As outlined above, the hyper text data signal including URL information (domain information) on the picture data signal is multiplexed during vertical blanking intervals of the TV video signal before being transmitted. This allows viewers watching TV broadcast programs to connect as needed automatically to any URL-designated WWW server on the globally expanding Internet. Thus the TV viewers can enjoy network services often called net-surfing whereby linked home pages are traced continuously for access to diverse www information sources on the Internet.

The embodiments above have been shown to be integrally incorporated in the TV receiver. Alternatively, the expanded functions composed of the data broadcast reception circuit 32, control microcomputer 34 and hard disk drive 35 in FIG. 2 may be housed in a separate expansion box popularly called a set-top box that combines with the existing TV receiver when used.

The hard disk drive 35 has been shown above as the preferred storage means for storing hyper text data signals and other data. Alternatively, the storage means may be implemented by use of a magneto-optical recording and reproduction apparatus that uses such removable magneto-optical recording media as MD (Mini Disk (™)) and MO (magneto-optical) disks. In the alternative case, switching recording media on the recording and reproduction apparatus makes it possible for TV receivers not connected with any network to gain access to files in a manner similar to the one described above.

As described, the use of hyper text data signals allows the user to take advantage of various information services including the TV program guide concerning TV broadcast programs.

In addition to the novel TV receiver capable of handling various information services and having its own commercial merit, the hyper text data signal including control information for presenting such information services may be offered to the public in a graduated service charge system whereby users are charged for the content of the hyper text data signal utilized. That is, with the hyper text data signal in use, different services may be offered to users at varied service charges.

The above-described embodiments of the invention may be supplemented by changes and variations such as one for having a WWW server on the Internet execute the processing related to TV broadcasts, and another for getting peripherals of the TV receiver 17 to carry out TV broadcast-related processes.

As described, the television transmitter and television transmitting method according to the invention generate text data signals associated with television broadcast programs and hyper text data signals corresponding to the text data signals, and multiplex the text data signals and hyper text data signals onto the video signals of the television broadcast programs. The invention when thus implemented introduces television programs to viewers in an easy-to-understand manner and allows them to select desired programs quickly and reliably.

The television receiver and television receiving method according to the invention receive text data signals extracted from the television broadcast signal which multiplexes therein video signals of television broadcast programs, the text data signals associated with the television broadcast programs, and hyper text data signals corresponding to the text data signals. The received text data signals are displayed so that the user may designate any one of them. The invention when thus implemented detects the hyper text data signal corresponding to the designated text data signal, and carries out the process in accordance with the hyper text data signal associated with the television broadcast program in question. In this manner, the user is offered explanations of many programs and select any one of the explained programs quickly and reliably.

As many apparently different embodiments of this invention may be made without departing from the spirit and scope thereof, it is to be understood that the invention is not limited to the specific embodiments thereof except as defined in the appended claims.

What is claimed is:

1. A television receiver comprising:

a receiving means for receiving a television broadcast signal including television program signals and multimedia data files including data described by a markup language, the multimedia data file relating to said television program signals, the data described by the markup language including one or more control signals for controlling display processing of said television receiver and controlling one or more other devices and including address information which designates a linked multimedia data file located at a server on a computer network;

an extraction means for extracting said multimedia data files from said received television broadcast signal;

a processing means for interpreting at least one of the extracted multimedia data files and generating a display signal, wherein the display signal includes link portions based on said data described by the markup language;

a user interface means for pointing to at least one of the displayed link portions; and a connection means for establishing a connection with said server having said address information and for receiving said linked multimedia data file from said server, wherein said processing means recognizes said address information of each pointed to link portion, retrieves said linked multimedia data file corresponding to said recognized address information from said server via said connection means, and interprets said retrieved linked multimedia data file and generates said display signal, and when said retrieved linked multimedia data file includes said one or more control signals for controlling said one or more other devices, said processing means outputs a command signal according to said one or more control signals to said one or more other devices.

2. The television receiver according to claim 1, wherein said connection means is connected via a telephone line to said server designated by a Uniform Resource Locator as said address information.

3. The television receiver according to claim 1, wherein said multimedia data files further include at least one of image data, audio data, text data and moving picture data.

4. The television receiver according to claim 1, wherein said user interface means is a remote commander.

5. The television receiver according to claim 1, further comprising:

a storage means for storing the extracted multimedia data files, wherein said multimedia data files are transmitted at a predetermined time from a broadcast station and are stored in said storage means.

6. The television receiver according to claim 1, wherein said data described by the markup language is written in Hyper Text Markup Language.

7. The television receiver according to claim 1, wherein:

said linked multimedia data file includes second data described by the markup language including second address information which designates a second linked multimedia data file located at a second server on said computer network;

said display signal includes a second link portion according to said second data described by the markup language; and said processing means recognizes said second address information corresponding to the displayed second link portion as indicated by said user interface means, retrieves said second linked multimedia data file corresponding to the recognized second address information from said second server via said connection means, interprets said second linked multimedia data file, and generates said display signal including said second linked multimedia data file.

8. A television receiver comprising:

a receiving means for receiving a television broadcast signal including television program signals and multimedia data files including data described by a markup language, the multimedia data files relating to said television program signals, the data described by the markup language including one or more control signals for controlling display processing of said television receiver and controlling one or more other devices and including address information which designates a linked multimedia data file;

an extraction means for extracting said multimedia data files from said received television broadcast signal;

a storage means for storing the extracted multimedia data files;

a processing means for retrieving at least one of said stored multimedia data files from said storage means, and for interpreting said retrieved at least one of said stored multimedia data files and generating a display signal, wherein the display signal includes link portions based on said data described by the markup language; and a user interface means for pointing to at least one of the displayed link portions, wherein said processing means recognizes said address information of each pointed to link portion, retrieves said linked multimedia data file corresponding to said recognized address information from said storage means, and interprets said retrieved linked multimedia data file and generates said display signal, and when said retrieved linked multimedia data file includes said one or more control signals for controlling said one or more other devices, said processing means outputs a command signal according to said one or more control signals to said one or more other devices.

9. The television receiver according to claim 8, wherein said multimedia data files further include at least one of image data, audio data, text data and moving picture data.

10. The television receiver according to claim 8, wherein said user interface means is a remote commander.

11. The television receiver according to claim 8, wherein said multimedia data files are transmitted at a predetermined time from a broadcast station and are stored in said storage means.

12. The television receiver according to claim 8, wherein said data described by the markup language is written in Hyper Text Markup Language.

13. The television receiver according to claim 8, wherein said address information designates said linked multimedia data file located at a server on a computer network.

14. The television receiver according to claim 13, further comprising:
- a connection means for establishing a connection with said server having said address information and for receiving said linked multimedia data file from said server; and
- a control means for controlling said connection means to execute establishment of said connection when said address information recognized by said processing means designates said linked multimedia data file located at said server on said computer network.

15. The television receiver according to claim 8, wherein:
- said linked multimedia data file includes second data described by the markup language including second address information which designates a second linked multimedia data file;
- said display signal includes a second link portion according to said second data described by the markup language; and
- said processing means recognizes said second address information corresponding to the displayed second link portion as indicated by said user interface means, retrieves said second linked multimedia data file corresponding to the recognized second address information, interprets said second linked multimedia data file, and generates said display signal including said second linked multimedia data file.

16. A method of receiving and displaying television and hyper text information, comprising:
- a reception step of receiving a television broadcast signal including television program signals and multimedia data files including data described by a markup language, said multimedia data files relating to said television program signals, the data described by the markup language including one or more control signals for controlling display processing of a television receiver and controlling one or more other devices and including address information which designates a linked multimedia data file located at a server on a computer network;
- an extraction step of extracting said multimedia data files from said received television broadcast signal;
- a processor step of interpreting at least one of the extracted multimedia data files and of generating a display signal, wherein said display signal includes link portions based on said data described by the markup language;
- a user interface step of pointing to at least one of the displayed link portions; and
- a connection step of establishing a connection with said server having said address information and for receiving said linked multimedia data file from said server, wherein said processor step further recognizes said address information of each pointed to link portion, retrieves said linked multimedia data file corresponding to the recognized address information from said server in said connection step, interprets the retrieved linked multimedia data file, and generates said display signal, and when said retrieved linked multimedia data file includes said one or more control signals for controlling said one or more other devices, said processor step outputs a command signal according to said one or more control signals to said one or more other devices.

17. The television receiving method according to claim 16, wherein said connection step is performed via a telephone line to said server designated by a Uniform Resource Locator as said address information.

18. The television receiving method according to claim 16, wherein said multimedia data files further include at least one of image data, audio data, text data and moving picture data.

19. The television receiving method according to claim 16, wherein said user interface step is performed using a remote commander.

20. The television receiving method according to claim 16, further comprising:
- a storage step of storing said extracted multimedia data files, wherein said multimedia data files are transmitted at a predetermined time from a broadcast station and are stored in said storage step.

21. The television receiving method according to claim 16, wherein said data described by the markup language is written in Hyper Text Markup Language.

22. The television receiving method according to claim 16, wherein:
- said linked multimedia data file includes second data described by the markup language including second address information which designates a second linked multimedia data file located at a second server on said computer network;
- said display signal includes a second link portion according to said second data described by the markup language; and
- said processor step further recognizes said second address information corresponding to the displayed second link portion as indicated in said user interface step, retrieves said second linked multimedia data file corresponding to the recognized second address information from said second server in said connection step, interprets said second linked multimedia data file, and generates said display signal including said second linked multimedia data file.

23. A television receiving method, comprising:
- a receiving step of receiving a television broadcast signal including television program signals and multimedia data files including data described by a markup language, the multimedia data files relating to said television program signals, the data described by the markup language including one or more control signals for controlling display processing of a television receiver and controlling one or more other devices and including address information which designates a linked multimedia data file;
- an extraction step of extracting said multimedia data files from the received television broadcast signal;
- a storage step of storing the extracted multimedia data files;
- a processing step of retrieving at least one of the stored multimedia data files stored in said storage step, and of interpreting the retrieved at least one of said stored multimedia data files and generating a display signal, wherein the display signal includes link portions based on said data described by the markup language; and a user interface step of pointing to at least one of the displayed link portions, wherein said processing step recognizes said address information of each pointed to link portion, retrieves said linked multimedia data file corresponding to the recognized address information stored in said storage step, and interprets the retrieved linked multimedia data file and generates said display signal, and when said retrieved linked multimedia data file includes said one or more control signals for controlling said one or more other devices, said processing step outputs a command signal according to said one or more control signals to said one or more other devices.

24. The television receiving method according to claim 23, wherein said multimedia data files further include at least one of image data, audio data, text data and moving picture data.

25. The television receiving method according to claim 23, wherein said user interface step is performed using a remote commander.

26. The television receiving method according to claim 23, wherein said multimedia data files are transmitted at a predetermined time from a broadcast station and are stored in said storage step.

27. The television receiving method according to claim 23, wherein said data described by the markup language is written in Hyper Text Markup Language.

28. The television receiving method according to claim 23, wherein said address information designates said linked multimedia data file located at a server on a computer network.

29. The television receiving method according to claim 28, further comprising:

a connection step of establishing a connection with said server having said address information and of receiving said linked multimedia data file from said server; and a control step of controlling said connection step to execute establishment of said connection when said address information recognized by said processing step designates said linked multimedia data file located at said server on said computer network.

30. The television receiving method according to claim 23, wherein:

said linked multimedia data file includes second data described by the markup language including second address information which designates a second linked multimedia data file;

said display signal includes a second link portion according to said second data described by the markup language; and said processing step further recognizes said second address information corresponding to the displayed second link portion as indicated in said user interface step, retrieves said second linked multimedia data file corresponding to the recognized second address information, interprets said second linked multimedia data file, and generates said display signal including said second linked multimedia data file.

31. A television receiver comprising:

a television broadcast reception circuit configured to receive a television broadcast signal and in accordance therewith generate television program signals;

a data broadcast reception circuit, coupled to said television broadcast reception circuit, said data broadcast reception circuit configured to receive said television broadcast signal and in accordance therewith generate multimedia data files, wherein said television signal includes said television program signals and said multimedia data files, wherein said multimedia data files are related to said television program signals and include data described by a markup language, and wherein said data described by the markup language includes one or more control signals for controlling display processing of said television receiver and controlling one or more other devices and includes address information which designates a linked multimedia data file located at a server on a computer network;

an audio-visual processing circuit, coupled to said data broadcast reception circuit and said television broadcast reception circuit, said audio-visual processing circuit configured to receive said television program signals and said multimedia data files and in accordance therewith generate a display signal including link portions according to said data described by the markup language;

a modem configured to connect to said server having said address information and to receive said linked multimedia data file from said server; and a control microcomputer, coupled to said data broadcast reception circuit, said television broadcast reception circuit, said audio-visual processing circuit and said modem, said control microcomputer configured to receive an operation signal and in accordance therewith control said data broadcast reception circuit, said television broadcast reception circuit, said audio-visual processing circuit and said modem, wherein said operation signal further indicates selection of said link portion by a user, and in accordance therewith said audio-visual processing circuit generates said display signal, and when said received linked multimedia data file includes said one or more control signals for controlling said one or more other devices, said processing means outputs a command signal according to said one or more control signals to said one or more other devices.

32. The television receiver according to claim 31, further comprising:

a disk drive, coupled to said control microcomputer, said disk drive configured to store said multimedia data files and said linked multimedia data file.

33. The television receiver according to claim 31, wherein:

said linked multimedia data file includes second data described by the markup language including second address information which designates a second linked multimedia data file located at a second server on said computer network;

said display signal includes a second link portion according to said second data described by the markup language; and said operation signal further indicates selection of said second link portion by said user, and in accordance therewith said audio-visual processing circuit generates said display signal including said second linked multimedia data file.

34. The television receiver according to claim 1, wherein said one or more other devices is a recording device connected to said television receiver.

35. The television receiver according to claim 1, wherein said one or more other devices is said connection means.

36. The television receiver according to claim 1, wherein said one or more other devices is said server on said computer network, and said processing means outputs said command signal to said server through said connection means.

37. The television receiver according to claim 8, wherein said one or more other devices is a recording device connected to said television receiver.

38. The television receiver according to claim 8, wherein said one or more other devices is a modem for making a connection with a server on a computer network.

39. The television receiver according to claim 8, wherein said one or more other devices is a server on a computer network, and said processing means outputs said command signal to said server through a modem.

40. The method according to claim 16, wherein said one or more other devices is a recording device connected to said television receiver.

41. The method according to claim 16, wherein said one or more other devices is a modem that performs said connection step.

42. The method according to claim 16, wherein said one or more other devices is said server on said computer network, and said processor step outputs said command signal to said server via said connection step.

43. The method according to claim 23, wherein said one or more other devices is a recording device connected to said television receiver.

44. The method according to claim 23, wherein said one or more other devices is a modem for making a connection with a server on a computer network.

45. The method according to claim 23, wherein said one or more other devices is a server on a computer network, and said processing step outputs said command signal to said server through a modem.

46. The television receiver according to claim 31, wherein said one or more other devices is a recording device connected to said television receiver.

47. The television receiver according to claim 31, wherein said one or more other devices is said modem.

48. The television receiver according to claim 31, wherein said one or more other devices is said server on said computer network, and said control microcomputer outputs said command signal to said server through said modem.

* * * * *

UNITED STATES PATENT AND TRADEMARK OFFICE
CERTIFICATE OF CORRECTION

PATENT NO.     : 6,199,206 B1
DATED          : March 6, 2001
INVENTOR(S)    : Hisao Nishioka et al.

Page 1 of 1

It is certified that error appears in the above-identified patent and that said Letters Patent is hereby corrected as shown below:

<u>Column 5,</u>
Line 21, change ", upon" to -- . Upon --.

<u>Column 14,</u>
Line 20, change "www" to -- WWW --;
Line 22, change "Alternatively" to -- Alternatively --; and
Line 30, change "Alternatively" to -- Alternatively --.

<u>Column 15,</u>
Line 14, change "select" to -- selects --.

Signed and Sealed this

Twenty-sixth Day of February, 2002

Attest:

JAMES E. ROGAN
*Attesting Officer*        *Director of the United States Patent and Trademark Office*